(12) United States Patent
Hirakawa et al.

(10) Patent No.: US 9,771,117 B2
(45) Date of Patent: Sep. 26, 2017

(54) VEHICLE

(71) Applicant: YAMAHA HATSUDOKI KABUSHIKI KAISHA, Iwata-shi, Shizuoka (JP)

(72) Inventors: Nobuhiko Hirakawa, Shizuoka (JP); Hiroshi Suzuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/318,694

(22) PCT Filed: Sep. 28, 2015

(86) PCT No.: PCT/JP2015/077377
§ 371 (c)(1),
(2) Date: Dec. 14, 2016

(87) PCT Pub. No.: WO2016/052430
PCT Pub. Date: Apr. 7, 2016

(65) Prior Publication Data
US 2017/0129562 A1   May 11, 2017

(30) Foreign Application Priority Data
Sep. 29, 2014  (JP) ................. 2014-199003

(51) Int. Cl.
*B62K 5/08*  (2006.01)
*B62K 5/05*  (2013.01)
(Continued)

(52) U.S. Cl.
CPC .............. *B62K 5/08* (2013.01); *B62D 61/065* (2013.01); *B62J 99/00* (2013.01); *B62K 5/05* (2013.01);
(Continued)

(58) Field of Classification Search
CPC combination set(s) only.
See application file for complete search history.

(56) References Cited

U.S. PATENT DOCUMENTS 4,787,470 A * 11/1988 Badsey ................ B62D 61/065
                                                   180/210
D552,506 S * 10/2007 Deluy ............................. D12/7
(Continued)

FOREIGN PATENT DOCUMENTS

JP      2011-057018 A      3/2011
JP      2011-126514 A      6/2011
(Continued)

OTHER PUBLICATIONS

Official Communication issued in International Application PCT/JP2015/077377, dated Dec. 22, 2015.
(Continued)

*Primary Examiner* — Nicole T Verley
(74) *Attorney, Agent, or Firm* — Keating and Bennett, LLP

(57) ABSTRACT

A portion of a body cover which is not movable relative to a body frame defines a space to guide air to an air cleaner. When a vehicle is in a condition that the body frame is in an upright state and is viewed from the front in a front-rear direction of the body frame, the space is at least partially situated at least one of above a lower end of an upper cross member in an up-down direction of the body frame, on the left of a left edge of a linkage in a left-right direction of the body frame, and on the right of a right edge of the linkage in the left-right direction of the body frame.

12 Claims, 11 Drawing Sheets

(51) Int. Cl.
  *B62K 5/06* (2006.01)
  *B62J 99/00* (2009.01)
  *B62D 61/06* (2006.01)
  *F02M 35/024* (2006.01)
  *F02M 35/16* (2006.01)
  *B62K 5/10* (2013.01)

(52) U.S. Cl.
  CPC .............. *B62K 5/06* (2013.01); *B62K 5/10* (2013.01); *F02M 35/024* (2013.01); *F02M 35/162* (2013.01)

(56) References Cited

U.S. PATENT DOCUMENTS

| | | | | |
|---|---|---|---|---|
| 7,543,673 | B2 * | 6/2009 | Lachapelle | B62J 15/00 180/210 |
| D603,775 | S * | 11/2009 | Longpre | D12/192 |
| D627,263 | S * | 11/2010 | Guay | D12/110 |
| D629,724 | S * | 12/2010 | Guay | D12/164 |
| 9,694,872 | B2 * | 7/2017 | Laroche | B62M 7/02 |
| 2004/0035624 | A1 * | 2/2004 | Fecteau | B62J 1/12 180/210 |
| 2005/0039967 | A1 * | 2/2005 | Aube | B62J 6/00 180/312 |
| 2005/0217909 | A1 * | 10/2005 | Guay | B60K 11/04 180/68.4 |
| 2006/0037801 | A1 * | 2/2006 | Iwashita | B60L 3/0084 180/220 |
| 2006/0065456 | A1 * | 3/2006 | Noda | B62K 11/04 180/219 |
| 2006/0254842 | A1 * | 11/2006 | Dagenais | B60T 8/1706 180/215 |
| 2007/0074920 | A1 * | 4/2007 | Hayashi | B62K 11/10 180/228 |
| 2007/0256882 | A1 * | 11/2007 | Bedard | B62K 5/027 180/312 |
| 2009/0075152 | A1 * | 3/2009 | Horji | B62K 5/027 429/444 |
| 2009/0218153 | A1 | 9/2009 | Codere et al. | |
| 2011/0060494 | A1 | 3/2011 | Tsujii et al. | |
| 2012/0232758 | A1 * | 9/2012 | Mercier | B60G 17/0157 701/41 |
| 2015/0114740 | A1 * | 4/2015 | Hall | F16H 3/22 180/210 |
| 2015/0122567 | A1 * | 5/2015 | Marois | B62K 5/027 180/210 |
| 2015/0232147 | A1 | 8/2015 | Hirayama et al. | |
| 2016/0114850 | A1 * | 4/2016 | Takano | B62K 11/04 180/210 |
| 2016/0221636 | A1 * | 8/2016 | Laroche | B62K 5/027 |
| 2017/0057594 | A1 * | 3/2017 | Watanabe | B62K 25/04 |
| 2017/0087977 | A1 * | 3/2017 | Yokoyama | B60K 1/04 |
| 2017/0087978 | A1 * | 3/2017 | Tako | B60K 11/06 |
| 2017/0088232 | A1 * | 3/2017 | Kaneta | B62K 25/08 |

FOREIGN PATENT DOCUMENTS

| | | |
|---|---|---|
| JP | 5536967 B1 | 7/2014 |
| TW | I349633 B | 10/2011 |
| TW | I354634 B | 12/2011 |
| TW | I417215 B | 12/2013 |

OTHER PUBLICATIONS

Official Communication issued in Tawianese Application No. 104132298, dated Sep. 10, 2016.

* cited by examiner

VEHICLE

BACKGROUND OF THE INVENTION

1. Field of the Invention

The present invention relates to a vehicle including a body frame that leans and two front wheels which are arranged side by side in a left-right direction of the body frame.

2. Description of the Related Art

A vehicle is known which includes a body frame that leans in a left-right direction of the vehicle when the vehicle turns to the left or the right and two front wheels which are arranged side by side in a left-right direction of the body frame (refer to Japanese Patent Publication No. 2011-057018A, for example). This type of vehicle is able to turn with its body frame leaning from a vertical direction. More specifically, the body frame leans rightward in the left-right direction of the vehicle when the vehicle turns to the right, while the body frame leans leftward in the left-right direction of the vehicle when the vehicle turns to the left. As this occurs, the relative positions of the left front wheel and the right front wheel in an up-down direction of the body frame changes.

The vehicle described in Japanese Patent Publication No. 2011-057018A uses a configuration that is a so-called leading arm mechanism in order to permit a change in the relative position of the left front wheel and the right front wheel to the body frame when the vehicle takes a turn. This configuration includes a left upper arm, a left lower arm, a right upper arm, and a right lower arm that extend in a front-rear direction of the body frame. The configuration also includes a left knuckle arm and a right knuckle arm that extend in the up-down direction of the body frame. The left front wheel is supported by the left knuckle arm. The right front wheel is supported by the right knuckle arm. Respective rear portions of the left upper arm and the right upper arm are supported on a front portion of the body frame. Respective front portions of the left upper arm and the left lower arm are supported on the left knuckle arm. The left upper arm and the left lower arm are able to turn relative to the body frame about a pivot shaft that extends in the left-right direction of the body frame. This allows the left front wheel that is supported on the left knuckle arm to be displaced in the up-down direction of the body frame. Respective rear portions of the right upper arm and the right lower arm are supported on the front portion of the body frame. Respective front portions of the right upper arm and the right lower arm are supported on the right knuckle arm. The right upper arm and the right lower arm are able to turn relative to the body frame about a pivot shaft that extends in the left-right direction of the body frame. This allows the right front wheel that is supported on the right knuckle arm to be displaced in the up-down direction of the body frame.

The vehicle described in Japanese Patent Publication No. 2011-057018A includes a balance beam that extends in the left-right direction of the body frame. The balance beam is supported on the body frame. The balance beam is able to turn about a shaft that extends in the front-rear direction of the body frame. The left lower arm is connected to a left end of the balance beam via a left shock absorber. The right lower arm is connected to a right end of the balance beam via a right shock absorber. This allows the displacement of the left front wheel in the up-down direction to be associated with the displacement of the right front wheel in the up-down direction. For example, when the left front wheel is displaced upwards in the up-down direction of the body frame, a left end of the balance beam is displaced upwards in the up-down direction of the body frame, while a right end of the balance beam is displaced downwards in the up-down direction of the body frame. This displaces the right front wheel downwards in the up-down direction of the body frame.

In addition, the vehicle described in Japanese Patent Publication No. 2011-057018A is a so-called sport-type vehicle. In the vehicle described in Japanese Patent Publication No. 2011-057018A, the power drive is disposed between the front wheels and the rear wheel in the front-rear direction of the body frame. In the vehicle described in Japanese Patent Publication No. 2011-057018A, the fuel tank is disposed directly above the power drive in the up-down direction of the body frame. In the vehicle described in Japanese Patent Publication No. 2011-057018A, the seat is disposed directly behind the fuel tank in the front-rear direction of the body frame. The vehicle described in Japanese Patent Publication No. 2011-057018A is a vehicle on which the rider rides in such a way as to straddle the body frame. Namely, a portion of the body frame which is disposed ahead of the seat on which the rider sits when he or she rides the vehicle in the front-rear direction of the body frame is disposed between both feet of the rider.

The leading arm mechanism includes the upper arm and the lower arm that extend in the front-rear direction of the body frame for each of the left front wheel and the right front wheel. The upper arm and the lower arm pivot individually about the pivot shaft that extends in the left-right direction of the body frame. Therefore, the movable ranges of the left front wheel and the right front wheel in relation to the up-down direction of the body frame is easily increased. In the event of the displacement amount of the relative position of the left front wheel and the right front wheel in the up-down direction of the body frame being great, the angular range in which the body frame is able to lean in the left-right direction of the vehicle is increased. Consequently, the leading arm mechanism is suitable for a sport-type vehicle for which a large leaning angle of the body frame in the left-right direction of the body frame is desired.

In order to increase the angle at which the body frame is able to lean in the left-right direction of the vehicle, it is necessary to increase the variation in the relative position of the right front wheel and the left front wheel in the up-down direction of the body frame. Accordingly, it is necessary to increase the dimensions of the upper arms and the lower arms that define the leading arm mechanism in relation to the front-rear direction of the body frame. In other words, it is necessary to increase the distance between the pivot centers of each upper arm and each lower arm and each front wheel in relation to the front-rear direction of the body frame. As this occurs, the overall dimension of the vehicle in the front-rear direction of the body frame is increased. Further, each upper arm and each lower arm that are large in size in the front-rear direction move greatly in the up-down direction of the body frame about the pivot shaft. Therefore, it is inevitable that the movable range of the leading arm mechanism is increased. Since it is necessary that the individual constituent components that are mounted at the front portion of the vehicle are disposed so as to avoid the movable range of the leading arm mechanism, the front portion of the vehicle tends to be enlarged in size.

SUMMARY OF THE INVENTION

Preferred embodiments of the present invention provide a vehicle including a body frame that leans and two front wheels that are arranged side by side in a left-right direction of the body frame that significantly reduces or prevents an enlargement in the size of a front portion of the vehicle while increasing the angle at which the body frame is able to lean in the left-right direction of the vehicle.

The inventor of the present invention studied whether or not the front portion of the vehicle is restricted from being enlarged in size while increasing the leaning angle of the body frame in the left-right direction of the vehicle by using a different system from the leading arm mechanism in the vehicle including the body frame that leans and the two front wheels that are arranged side by side in the left-right direction of the body frame. Specifically, the inventor of the present invention studied using a parallelogram linkage system.

The parallelogram linkage system is supported on the body frame at the link support. The parallelogram linkage system includes a left side member, a right side member, and a cross member. The left side member is disposed on the left of the link support in relation to the left-right direction of the body frame. At least a portion of the left side member is disposed directly above the left front wheel in the up-down direction of the body frame when the vehicle is viewed from the left-right direction of the body frame. The right side member is disposed on the right of the link support in relation to the left-right direction of the body frame. At least a portion of the right side member is disposed directly above the right front wheel in the up-down direction of the body frame when the vehicle is viewed from the left-right direction of the body frame. The left portion of the cross member is supported on the left side member so as to turn about the left turning axis that extends in the front-rear direction of the body frame. The right portion of the cross member is supported on the right side member so as to turn about the right turning axis that extends in the front-rear direction of the body frame. The intermediate portion of the cross portion is supported on the link support so as to turn about the intermediate turning axis that extends in the front-rear direction of the body frame. The parallelogram linkage system changes the relative position of the left front wheel and the right front wheel in the up-down direction of the body frame to cause the body frame to lean leftward or rightward of the vehicle as the cross member turns about the intermediate turning axis.

In this parallelogram linkage system, the cross member operates so as to permit the displacement of the left front wheel and the right front wheel in the up-down direction of the body frame and extends in the left-right direction of the body frame. Additionally, at least portions of the left side member and the right side member, which are displaced in opposite directions in relation to the up-down direction of the body frame as the cross member turns, are disposed directly above the left front wheel and the right front wheel, respectively, in the up-down direction of the body frame when the vehicle is viewed from the left-right direction of the body frame. This configuration prevents an increase in the overall dimension of the vehicle in the front-rear direction of the body frame even though the movable range of the parallelogram linkage system in the up-down direction of the body frame is increased in order to increase the leaning angle of the body frame in the left-right direction of the vehicle.

A power drive including an engine and a transmission is disposed between the two front wheels and the rear wheel in the front-rear direction of the body frame. In the case of a so-called sport-type vehicle, an air cleaner through which air passes to be supplied to the engine is disposed above the transmission in the up-down direction of the body frame. The air cleaner needs to allow an amount of air that is required by the engine to pass through. The inventor of the present invention considered the risk that the air guided to the air cleaner is interrupted because the movable range of the parallelogram linkage system as described above is wide when the vehicle is viewed from the front-rear direction of the body frame. In particular, in the sport-type vehicle of which the body frame leans in the left-right direction of the vehicle at a great leaning angle, the movable range of the parallelogram linkage system becomes wide. Because of this, the inventor of the present invention thought that in the sport-type vehicle, the air guided to the air cleaner is interrupted remarkably.

When the body frame is caused to lean leftward of the vehicle, the cross member turns about the intermediate turning axis of the link support. Specifically, the cross member turns so that the left portion of the cross member moves upwards in the up-down direction of the body frame and the right portion of the cross member moves downwards in the up-down direction of the body frame. The left side member and the left portion of the cross member are displaced upwards in the up-down direction of the body frame and rightward in the left-right direction of the body frame from their positions when the body frame is in the upright state. The right side member and the right portion of the upper cross member are displaced in the up-down direction of the body frame and leftward in the left-right direction of the body frame from their positions when the body frame is in the upright state upwards.

When the body frame is caused to lean rightward of the vehicle, the cross member turns about the intermediate turning axis of the link support. Specifically, the cross member turns so that the right portion of the cross member moves upwards in the up-down direction of the body frame and the left portion of the cross member moves downwards in the up-down direction of the body frame. The left side member and the left portion of the cross member are displaced downwards in the up-down direction of the body frame and rightward in the left-right direction of the body frame from their positions when the body frame is in the upright state. The right side member and the right portion of the cross ember are displaced in the up-down direction of the body frame and leftward in the left-right direction of the body frame from their positions when the body frame is in the upright state upwards.

In view of the operation of the parallelogram linkage system, the inventor of the present invention considered an area located above the lower end of the upper cross portion in the up-down direction of the body frame, an area located on the left of a left edge of the parallelogram linkage system in the left-right direction of the body frame, and an area located on the right of a right edge of the parallelogram linkage system in the left-right direction of the body frame. In the event of the body cover that is provided so as not to be movable relative to the body frame being disposed in these areas, the inventor of the present invention considered a space above the lower end of the cross member in the up-down direction of the body frame by the body cover, a space on the left of the left edge of the parallelogram linkage system in the left-right direction of the body frame by the body cover, and a space on the right of the right edge of the parallelogram linkage system in the left-right direction of the body frame by the body cover, when the vehicle is in the condition that the body frame is in the upright state and is viewed from the front in the front-rear direction of the body frame.

The space above the left side member and the left portion of the cross member in the up-down direction of the body frame by the body cover and the space above the right side member and the right portion of the cross member in the up-down direction of the body frame by the body cover will be described.

In the case of the body frame being caused to lean leftward of the vehicle, the left side member and the left portion of the cross member move upwards from their positions when the body frame is in the upright state. Because of this, compared with the space when the body frame is in the upright state, a space above the left side member and the left portion of the cross member in the up-down direction of the body frame becomes narrow. On the other hand, the right side member and the right portion of the cross member move downwards from their positions when the body frame is in the upright state. Because of this, a space above the right side member and the right portion of the cross member in the up-down direction of the body frame by the body cover becomes wide.

In the case of the body frame being caused to lean rightward of the vehicle, the right side member and the right portion of the cross member move upwards from their positions when the body frame is in the upright state. Because of this, a space above the right side member and the right portion of the cross member in the up-down direction of the body frame by the body cover becomes narrow. On the other hand, the left side member and the left portion of the cross member move downwards from their positions when the body frame is in the upright state. Because of this, compared with the space when the body frame is in the upright state, a space above the left side member and the left portion of the cross member in the up-down direction of the body frame by the body cover becomes wide.

The space on the left of the left side member and the left portion of the cross member in the left-right direction of the body frame by the body cover and the space on the right of the right side member and the right portion of the cross member in the left-right direction of the body frame by the body cover will be described.

In the case of the body frame being caused to lean leftward of the vehicle, the left side member and the left portion of the cross member move rightward relative to the body frame from their positions when the body frame is in the upright state. Because of this, compared with the space when the body frame is in the upright state, a space on the left of the left side member and the left portion of the cross member in the left-right direction of the body frame by the body cover becomes wide. On the other hand, the right side member and the right portion of the cross member move leftward relative to the body frame from their positions when the body frame is in the upright state. Because of this, compared with the space when the body frame is in the upright state, a space on the right of the right side member and the right portion of the cross member in the left-right direction of the body frame by the body cover becomes wide.

In the case of the body frame being caused to lean rightward of the vehicle, the left side member and the left portion of the cross member move rightward relative to the body frame from their positions when the body frame is in the upright state. Because of this, compared with the space when the body frame is in the upright state, a space on the left of the left side member and the left portion of the cross member in the left-right direction of the body frame by the body cover becomes wide. On the other hand, the right side member and the right portion of the cross member move leftward relative to the body frame from their positions when the body frame is in the upright state. Because of this, compared with the space when the body frame is in the upright state, a space on the right of the right side member and the right portion of the cross member in the left-right direction of the body frame by the body cover becomes wide.

Namely, when the vehicle is in the condition that the body frame is in the upright state and is viewed from the front in the front-rear direction of the body frame, a sectional area of the space above the lower end of the cross member in the up-down direction of the body frame by the body cover changes a little even though the shape of the parallelogram linkage system changes greatly as the body frame leans. This fact remains true irrespective of the leaning angle of the body frame in the left-right direction of the vehicle. In addition, when the vehicle is in the condition that the body frame is in the upright state and is viewed from the front in the front-rear direction of the body frame, sectional areas of the spaces on the left of the left edge of the parallelogram linkage system in the left-right direction of the body frame and on the right of the right edge of the parallelogram linkage system in the left-right direction of the body frame by the body cover increase as the body frame continues to lean. This fact also remains true irrespective of the leaning angle of the body frame in the left-right direction of the vehicle.

The inventor of the present invention discovered that air is guided smoothly to the air cleaner even though the parallelogram linkage system described above is used and the body frame is caused to lean in the left-right direction of the body frame at a great leaning angle by providing the body cover in such a way that the wind guiding spaces are above the lower end of the cross member in the up-down direction of the body frame, on the left of the left edge of the parallelogram linkage system in the left-right direction of the body frame, and on the right of the right edge of the parallelogram linkage system in the left-right direction of the body frame when the vehicle is in the condition that the body frame is in the upright state and is viewed from the front in the front-rear direction of the body frame, while the portion is provided which extends across the handlebar to turn the two front wheels in the front-rear direction of the body frame below the handlebar when the vehicle is viewed from above in the up-down direction of the body frame. Namely, the inventor of the present invention discovered that it is possible to significantly reduce or prevent an enlargement in the size of the front portion of the vehicle which would otherwise be necessary to guide air properly to the air cleaner even when at least a portion of the parallelogram linkage system is disposed directly above the left front wheel and the right front wheel in the up-down direction of the body frame when the vehicle is viewed from the left-right direction of the body frame.

Accordingly, a preferred embodiment of the present invention is a vehicle including a body frame that includes a link support and leans leftward of the vehicle when the vehicle turns to the left and leans rightward of the vehicle when the vehicle turns to the right; a left front wheel and a right front wheel arranged side by side in a left-right direction of the body frame; a rear wheel; a handlebar that turns the left front wheel and the right front wheel; a linkage including a left side member disposed on the left of the link support in the left-right direction of the body frame, and at least partially disposed directly above the left front wheel in an up-down direction of the body frame when the vehicle is viewed from the left-right direction of the body frame; a right side member disposed on the right of the link support in the left-right direction of the body frame, and at least partially disposed directly above the right front wheel in the up-down direction of the body frame when the vehicle is viewed from the left-right direction of the body frame; and a cross member including a left portion supported by the left side member so as to be turnable about a left turning axis extending in a front-rear direction of the body frame; a right portion supported by the right side member so as to be turnable about a right turning axis extending in the front-rear direction of the body frame; and an intermediate portion supported by the link support so as to be turnable about an intermediate turning axis extending in the front-rear direction of the body frame; a power drive disposed ahead of a front end of the rear wheel in the front-rear direction of the body frame when the vehicle is viewed from the left-right direction of the body frame so as not to be movable relative to the body frame, the power drive including an engine and a transmission; an air cleaner disposed above the transmission in the up-down direction of the body frame so as not to be movable relative to the body frame, the air cleaner allowing air to be supplied to the engine to pass therethrough; and a wind guiding cover disposed so as not to be movable relative to the body frame and defining a space to guide air to the air cleaner, the wind guiding cover including a portion extending in the front-rear direction of the body frame across an area located below the handlebar in the up-down direction of the body frame when the vehicle is viewed from the above in the up-down direction of the body frame, wherein the linkage changes relative positions of the left front wheel and the right front wheel in the up-down direction of the body frame in accordance with turning of the cross member to cause the body frame to lean leftward or rightward of the vehicle; and the wind guiding cover is disposed such that, when the vehicle is in a condition that the body frame is in an upright state and is viewed from the front in the front-rear direction, the space is at least partially situated at least one of above a lower end of the cross member in the up-down direction of the body frame; on the left of a left edge of the linkage in the left-right direction of the body frame; and on the right of a right edge of the linkage in the left-right direction of the body frame.

According to this configuration, even though the leaning angle of the body frame in the left-right direction of the vehicle is increased, air is easily guided to the air cleaner irrespective of the operation of the linkage. Thus, it is possible to significantly reduce or prevent an enlargement in the size of the front portion of the vehicle which would otherwise be necessary to ensure that air is properly guided to the air cleaner. Consequently, in a vehicle including a body frame that leans and two front wheels that are arranged side by side in a left-right direction of the body frame, it is possible to significantly reduce or prevent an enlargement in the size of a front portion of the vehicle while increasing the angle at which the body frame is able to lean in the left-right direction of the vehicle.

Preferably, the wind guiding cover is disposed such that, when the vehicle is in the condition that the body frame is in the upright state and is viewed from the front in the front-rear direction, the space is at least partially situated at least one of: above a lower end of a movable range of the cross member in the up-down direction of the body frame; on the left of a left end of a movable range of the linkage in the left-right direction of the body frame; and on the right of a right end of the movable range of the linkage in the left-right direction of the body frame.

According to this configuration, even though the leaning angle of the body frame in the left-right direction of the vehicle is increased, it is possible to guide air to the air cleaner more easily irrespective of the operating state of the linkage. This further reduces or prevents an enlargement in the size of the front portion of the vehicle which would otherwise be necessary to ensure that air is properly guided to the air cleaner. Consequently, it is possible to further restrict an enlargement in the size of the front portion of the vehicle while allowing the leaning angle of the body frame in the left-right direction of the vehicle to be increased.

Preferably, the vehicle is configured such that when the vehicle is in the condition that the body frame is in the upright state and is viewed from the up-down direction, the wind guiding cover includes a portion disposed at least one of: directly on the left of the body frame in the left-right direction of the body frame; and directly on the right of the body frame in the left-right direction of the body frame.

According to this configuration, it is easier to guide air that passes through the portions that are situated at least one of directly on the left and right of the linkage in the left-right direction of the body frame to the air cleaner. This further reduces or prevents an enlargement in the size of the front portion of the vehicle which would otherwise be necessary to ensure that air is properly guided to the air cleaner. Consequently, it is possible to significantly reduce or prevent an enlargement in the size of the front portion of the vehicle while allowing the leaning angle of the body frame in the left-right direction of the vehicle to be increased.

Preferably, the vehicle is configured such that when the vehicle is in the condition that the body frame is in the upright state and is viewed from the left-right direction, the wind guiding cover includes a portion disposed above the cross member in the up-down direction of the body frame.

According to this configuration, it is easy to guide air that passes through the portion located directly above the cross member in the up-down direction of the body frame to the air cleaner. This further reduces or prevents an enlargement in the size of the front portion of the vehicle which would otherwise be necessary to ensure that air is properly guided to the air cleaner. Consequently, it is possible to significantly reduce or prevent an enlargement in the size of the front portion of the vehicle while allowing the leaning angle of the body frame in the left-right direction of the vehicle to be increased.

Preferably, the wind guiding cover includes a portion disposed ahead of the linkage in the front-rear direction of the body frame.

According to this configuration, it is easy to guide an air flow received by the front portion of the vehicle in motion to the air cleaner. This further reduces or prevents an enlargement in the size of the front portion of the vehicle which would otherwise be necessary to ensure that air is properly guided to the air cleaner. Consequently, it is possible to significantly reduce or prevent an enlargement in the size of the front portion of the vehicle while allowing the leaning angle of the body frame in the left-right direction of the vehicle to be increased.

In this case, the wind guiding cover preferably includes an opening disposed ahead of the linkage in the front-rear direction of the body frame.

According to this configuration, it is easy to guide the air flow received by the front portion of the vehicle in motion to the spaces in the wind guiding cover. This further reduces or prevents an enlargement in the size of the front portion of the vehicle which would otherwise be necessary to ensure that air is properly guided to the air cleaner. Consequently, it is possible to significantly reduce or prevent an enlargement in the size of the front portion of the vehicle while allowing the leaning angle of the body frame in the left-right direction of the vehicle to be increased.

Preferably, the wind guiding cover includes a left wind guiding cover disposed on the left of the link support in the left-right direction of the body frame; and a right wind guiding cover disposed on the right of the link support in the left-right direction of the body frame; wherein a distance between the left wind guiding cover portion and the right wind guiding cover portion increases toward the front in the front-rear direction of the body frame at an area behind the handlebar in the front-rear direction of the body frame and ahead of a rear end of the air cleaner in the front-rear direction of the body frame, when the vehicle is in the condition that the body frame is in the upright state and is viewed from the up-down direction.

According to this configuration, air is guided easily to the air cleaner by the wind guiding cover. This further reduces or prevents an enlargement in the size of the front portion of the vehicle which would otherwise be necessary to ensure that air is properly guided to the air cleaner. Consequently, it is possible to significantly reduce or prevent an enlargement in the size of the front portion of the vehicle while allowing the leaning angle of the body frame in the left-right direction of the vehicle to be increased.

Preferably, the wind guiding cover includes an upper wind guiding cover partially defining the space disposed above the lower end of the cross member in the up-down direction of the body frame; and the upper wind guiding cover extends upward in the in the up-down direction of the body frame with an increasing distance from the air cleaner toward the front in the front-rear direction of the body frame at an area behind the handlebar in the front-rear direction of the body frame and ahead of a rear end of the air cleaner in the front-rear direction of the body frame, when the vehicle is in the condition that the body frame is in the upright state and is viewed from the left-right direction.

According to this configuration, air is guided easily to the air cleaner by the wind guiding cover. This further reduces or prevents an enlargement in the size of the front portion of the vehicle which would otherwise be necessary to ensure that air is properly guided to the air cleaner. Consequently, it is possible to significantly reduce or prevent an enlargement in the size of the front portion of the vehicle while allowing the leaning angle of the body frame in the left-right direction of the vehicle to be increased.

Preferably, the air cleaner is disposed ahead of a seat on which a rider sits in the front-rear direction of the body frame.

According to this configuration, a distance over which air guided by the portion of the wind guiding cover reaches the air cleaner is shortened. This further reduces or prevents an enlargement in the size of the front portion of the vehicle which would otherwise be necessary to ensure that air is properly guided to the air cleaner. Consequently, it is possible to significantly reduce or prevent an enlargement in the size of the front portion of the vehicle while allowing the leaning angle of the body frame in the left-right direction of the vehicle to be increased.

Preferably, the air cleaner is disposed ahead of the transmission in the front-rear direction of the body frame.

According to this configuration, a distance over which air guided by the portion of the wind guiding cover reaches the air cleaner is shortened. Consequently, it is possible to significantly reduce or prevent an enlargement in the size of the vehicle in the front-rear direction of the body frame, as well as the supply of the air to the air cleaner is stably performed.

Preferably, a front end of the air cleaner is disposed ahead of the engine in the front-rear direction of the body frame.

According to this configuration, a distance over which air guided by the portion of the wind guiding cover reaches the air cleaner is shortened. This further reduces or prevents an enlargement in the size of the front portion of the vehicle which would otherwise be necessary to ensure that air is properly guided to the air cleaner. Consequently, it is possible to significantly reduce or prevent an enlargement in the size of the front portion of the vehicle while allowing the leaning angle of the body frame in the left-right direction of the vehicle to be increased.

Preferably, the air cleaner includes an intake port opened to the front of the front-rear direction of the body frame.

According to this configuration, air is guided easily to the air cleaner by the wind guiding cover. This further reduces or prevents an enlargement in the size of the front portion of the vehicle which would otherwise be necessary to ensure that air is properly guided to the air cleaner. Consequently, it is possible to significantly reduce or prevent an enlargement in the size of the front portion of the vehicle while allowing the leaning angle of the body frame in the left-right direction of the vehicle to be increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
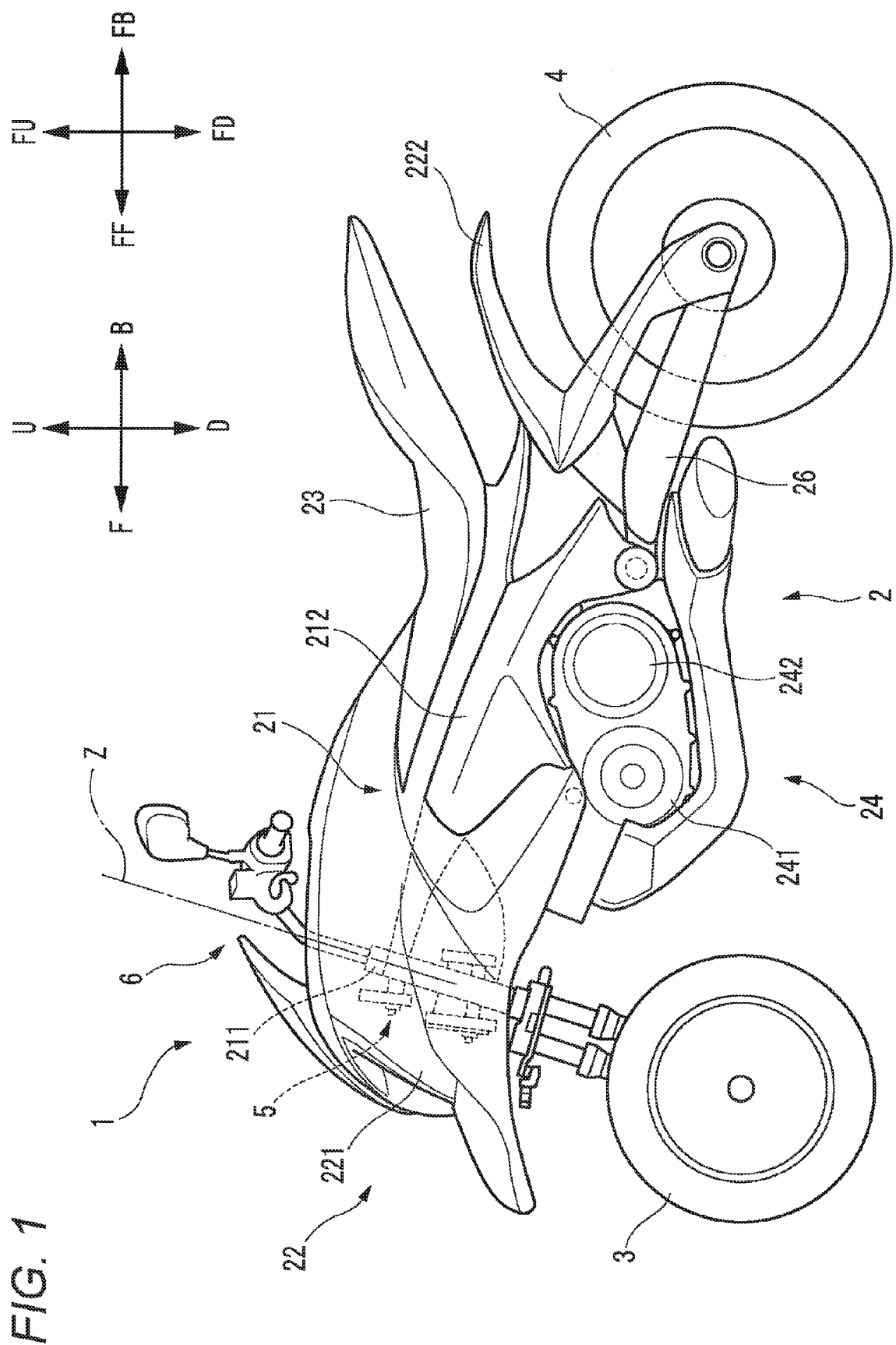
FIG. 1 is a left side view of an entire vehicle according to a preferred embodiment of the present invention, viewed from the left thereof.

Referring to the accompanying drawings, preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame leaning in a left-right direction of the vehicle relative to a vertical direction. In addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame," and an "up-down direction of the body frame" refer to a front-rear direction, a left-right direction, and an up-down direction based on the body frame as viewed from a rider who rides the vehicle. "A side of or sideways of the body frame" refers to directly on the right or left in the left-right direction of the body frame.

In this description, an expression "something extends in the front-rear direction of the body frame" includes a situation in which something extends while being inclined in relation to the front-rear direction of the body frame and means that something extends with a gradient which is closer to the front-rear direction of the body frame rather than the left-right direction and the up-down direction of the body frame.

In this description, an expression "something extends in the left-right direction of the body frame" includes a situation in which something extends while being inclined in relation to the left-right direction of the body frame and means that something extends with a gradient which is closer to the left-right direction of the body frame rather than the front-rear direction of the body frame and the up-down direction of the body frame.

In this description, an expression "something extends in the up-down direction of the body frame" includes a situation in which something extends while being inclined in relation to the up-down direction of the body frame and means that something extends with a gradient which is closer to the up-down direction of the body frame rather than the front-rear direction of the body frame and the left-right direction of the body frame.

In this description, an expression "the body frame is in the upright state" means that the up-down direction of the body frame coincides with the vertical direction in such a state that the vehicle is not steered. In this state, the directions based on the vehicle and the directions based on the vehicle frame coincide. When the vehicle is turning with the body frame leaning in the left-right direction relative to the vertical direction, the left-right direction of the vehicle does not coincide with the left-right direction of the body frame. As well, the up-down direction of the vehicle does not coincide with the up-down direction of the body frame. However, the front-rear direction of the vehicle coincides with the front-rear direction of the body frame.

In this description, an expression "directly on the left of a member A in the left-right direction of the body frame" denotes a space through which the member A passes when the member A is translated leftward in the left-right direction of the body frame. "Directly on the right of the member A" is also defined similarly.

In this description, an expression "on the left of the member A in the left-right direction of the body frame" includes not only a space through which the member A passes when the member A is translated leftward in the left-right direction of the body frame but also a space which expands from the space in directions which are at right angles to the left-right direction of the body frame. "On the right of the member A" is also defined similarly.

In this description, an expression "directly above a member A in the up-down direction of the body frame" denotes a space through which the member A passes when the member A is translated upward in the up-down direction of the body frame. "Directly below the member A" is also defined similarly.

In this description, an expression "above the member A in the up-down direction of the body frame" includes not only a space through which the member A passes when the member A is translated upward in the up-down direction of the body frame but also a space which expands from the space in directions which are at right angles to the up-down direction of the body frame. "Below the member A" is also defined similarly.

In this description, an expression "directly ahead of a member A in the front-rear direction of the body frame" denotes a space through which the member A passes when the member A is translated forward in the front-rear direction of the body frame. "Directly behind the member A" is also defined similarly.

In this description, an expression "ahead of the member A in the front-rear direction of the body frame" includes not only a space through which the member A passes when the member A is translated forward in the front-rear direction of the body frame but also a space which expands from the space in directions which are at right angles to the front-rear direction of the body frame. "Behind the member A" is also defined similarly.

Referring to FIGS. 1 to 11, a vehicle 1 according to preferred embodiments of the present invention will be described. The vehicle 1 includes a leanable body frame and two front wheels which are arranged side by side in the left-right direction of the body frame.

As shown in FIG. 1, the vehicle 1 includes a vehicle main body 2, two front wheels 3, a rear wheel 4, a linkage 5, and a steering mechanism 6.

The vehicle main body 2 includes a body frame 21, a body cover 22, a seat 23, a power drive 24, and a rear arm 26. In FIG. 1, the body frame 21 is in the upright state. The following description which refers to FIG. 1 will be made on the premise that the body frame 21 is in the upright state. FIG. 1 is a left side view when the entire vehicle 1 is viewed from the left in the left-right direction of the body frame 21.

The body frame 21 includes a head pipe 211 and a main frame 212. In FIG. 1, portions of the body frame 21 which are hidden by the body cover 22 are shown by dashed lines. The body frame 21 supports the seat 23 and the power drive 24.

The head pipe 211 is disposed at a front portion of the vehicle 1. When the body frame 21 is viewed from the left thereof, an upper portion of the head pipe 211 is disposed behind a lower portion of the head pipe 211.

The main frame 212 is connected to the head pipe 211. The main frame 212 is disposed behind the head pipe 211 in the front-rear direction of the body frame. The main frame 212 supports the seat 23, the power drive 24, and the rear arm 26.

The rear arm 26 is disposed behind the main frame 212 in the front-rear direction of the body frame 21. The rear arm 26 extends in the front-rear direction of the body frame 21. A front end of the rear arm 26 is supported on the main frame 212 and turns about an axis that extends in the left-right direction of the body frame 21. A rear end of the rear arm 26 supports the rear wheel 4.

The body cover 22 includes a front cover 221 and a rear fender 222. The body cover 22 is a body component that covers at least a portion of a group of components which make up the vehicle 1 such as the two front wheels 3, the body frame 21, the linkage 5, and the steering mechanism 6.

The front cover 221 is disposed ahead of the seat 23 in the front-rear direction of the body frame 21. The front cover 221 covers the linkage 5 and at least a portion of the steering mechanism 6. The front cover 221 is disposed so as not to be displaced relative to the body frame 21.

At least a portion of the rear fender 222 is disposed directly above the rear wheel 4 in the up-down direction of the body frame 21. The rear fender 222 is disposed so as not to be movable relative to the rear arm 26.

The two front wheels 3 are disposed below the head pipe 211 in the up-down direction of the body frame 21. At least a portion of the two front wheels 3 is disposed directly below the front cover 221 in the up-down direction of the body frame 21.

At least a portion of the rear wheel 4 is disposed below the seat 23 in the up-down direction of the body frame 21. At least a portion of the rear wheel 4 is disposed directly below the rear fender 223 in the up-down direction of the body frame 21.

The vehicle 1 is preferably a vehicle on which the rider mounts in a posture of straddling the body frame 21. Namely, when riding the vehicle 1, a portion of the body frame 21 which is disposed ahead of the seat 23 on which the rider sits in the front-rear direction of the body frame 21 is disposed between the legs of the rider. The rider rides the vehicle 1 in a posture of holding the main frame 212 or the front cover 221 that is positioned ahead of the seat 23 in the front-rear direction of the body frame 21 with the rider's legs.

Viewing the vehicle 1 from the left-right direction of the body frame 21, the power drive 24 is disposed ahead of a front end of the rear wheel 4 in the front-rear direction of the body frame 21. The power drive 24 is disposed so as not to be movable relative to the body frame 21. The power drive 24 is disposed so as not to be movable relative to the main frame 212. The power drive 24 includes an engine 241 and a transmission 242. The engine 241 produces a force to drive the vehicle 1. The transmission 242 transmits a driving force produced by the engine 241 to the rear wheel 4 and which changes the rotating speed of the rear wheel 4. The transmission 242 includes a gear box and a clutch. The transmission 242 includes a transmission mechanism. The transmission mechanism may be a multiple-speed transmission mechanism including a plurality of gears or a continuously variable transmission (CVT).

Figure 2:
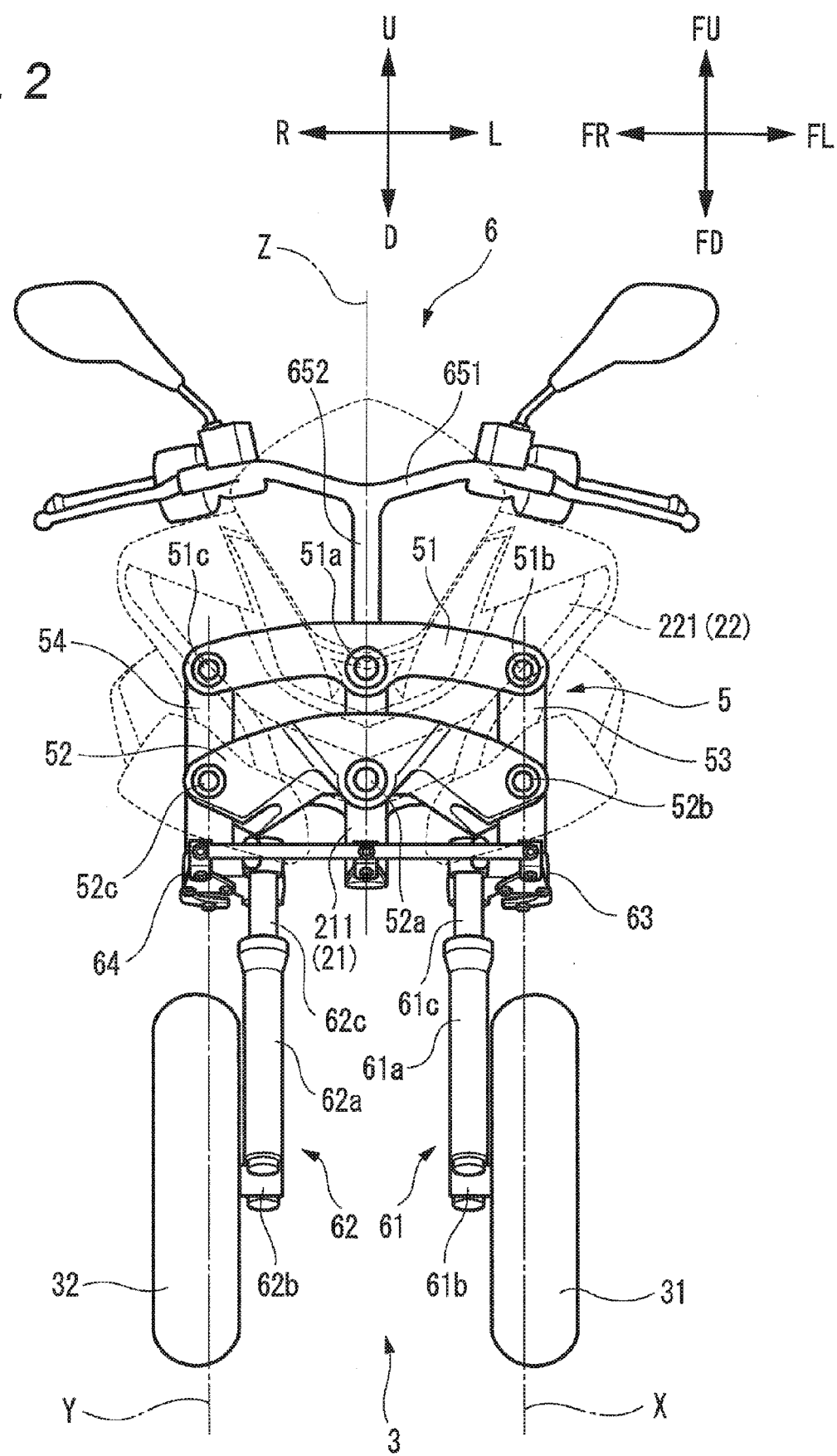
FIG. 2 is a front view showing a front portion of the vehicle of FIG. 1.

FIG. 2 is a front view of the front portion of the vehicle 1 as viewed from the front in the front-rear direction of the body frame 21. In FIG. 2, the body frame 21 is in the upright state. The following description which refers to FIG. 2 will be made on the premise that the body frame 21 is in the upright state. In FIG. 2, the vehicle 1 is depicted as seen through the body cover 22 which is indicated by dashed lines.

The two front wheels 3 include a left front wheel 31 and a right front wheel 32. The left front wheel 31 is disposed on the left of the head pipe 211 which is a portion of the body frame 21 in the left-right direction of the body frame 21. The right front wheel 32 is disposed below the head pipe 211 in the up-down direction of the body frame 21. The left front wheel 31 and the right front wheel 32 are arranged side by side in the left-right direction of the body frame 21.

The steering mechanism 6 includes a left shock absorber 61, a right shock absorber 62, a left bracket 63, and a right bracket 64.

The left shock absorber 61 includes a left lower portion 61a. The left lower portion 61a supports the left front wheel 31. The left lower portion 61a extends in the up-down direction of the body frame 21. The left lower portion 61a includes a left support 61b at a lower end thereof. The left front wheel 31 is supported on the left support 61b.

The left shock absorber 61 includes a left upper portion 61c. The left upper portion 61c extends in the up-down direction of the body frame 21. The left upper portion 61c is disposed directly above the left lower portion 61a in the up-down direction of the body frame 21 while being partially inserted in the left lower portion 61a. An upper portion of the left lower portion 61c is fixed to the left bracket 63.

The left shock absorber 61 is preferably a so-called telescopic shock absorber. The left upper portion 61c moves relatively in a direction in which the left lower portion 61a extends to the left lower portion 61a such that the left shock absorber 61 extends and contracts in the that direction. This enables the left shock absorber 61 to attenuate a displacement of the left front wheel 31 towards the left upper portion 61c in the up-down direction of the body frame 21.

The right shock absorber 62 includes a right lower portion 62a. The right lower portion 62a supports the right front wheel 32. The right lower portion 62a extends in the up-down direction of the body frame 21. The right lower portion 62a includes a right support 62b at a lower end thereof. The right front wheel 32 is supported on the right support 62b.

The right shock absorber 62 includes a right upper portion 62c. The right upper portion 62c extends in the up-down direction of the body frame 21. The right upper portion 62c is disposed directly above the right lower portion 62a in the up-down direction of the body frame 21 while being partially inserted in the right lower portion 62a. An upper portion of the right upper portion 62c is fixed to the right bracket 64.

The right shock absorber 62 is preferably a so-called telescopic shock absorber. The right upper portion 62c moves relatively in a direction in which the right lower portion 62a extends to the right lower portion 62a such that the right shock absorber 62 extends and contracts in the appropriate direction. This enables the right shock absorber 62 to attenuate an upward displacement of the right front wheel 32 towards the right upper portion 62c in the up-down direction of the body frame 21.

The steering mechanism 6 includes a steering force transmission 65. The steering force transmission 65 includes a handlebar 651 and a steering shaft 652. The handlebar 651 is attached to an upper portion of the steering shaft 652. The steering shaft 652 is turnably supported on the head pipe 211 at a portion thereof. An intermediate steering axis Z of the steering shaft 652 extends in the up-down direction of the body frame 21. As shown in FIG. 1, the upper portion of the steering shaft 652 is disposed behind a lower portion thereof in the front-rear direction of the body frame 21. Consequently, the central steering axis Z of the steering shaft 652 is inclined in the front-rear direction of the body frame 21. The steering shaft 652 turns about the intermediate steering axis Z in response to the operation of the handlebar 651 by the rider.

The steering force transmission mechanism 65 transmits a steering force with which the rider operates the handlebar 651 to the left bracket 63 and the right bracket 64. A specific configuration will be described in detail below.

In the vehicle 1 according to the present preferred embodiment, the linkage 5 preferably uses a four parallel joint link system (also referred to as a parallelogram link).

As shown in FIG. 2, the linkage 5 is disposed below the handlebar 651 in the up-down direction of the body frame 21. The linkage 5 disposed above the left front wheel 31 and the right front wheel 32 in the up-down direction of the body frame 21. The linkage 5 includes an upper cross member 51, a lower cross member 52, a left side member 53, and a right side member 54. The linkage 5 is not interlocked with the turning of the steering shaft 652 about the intermediate steering axis Z associated with the operation of the handlebar 651. Namely, the linkage 5 does not turn about the intermediate steering axis Z relative to the body frame 21.

An intermediate portion of the upper cross member 51 is supported on the head pipe 211 by a support 51a. The upper cross member 51 is able to turn relative to the head pipe 211 about an intermediate upper axis that passes through the support 51a to extend in the front-rear direction of the body frame 21.

A left end of the upper cross member 51 is supported on the left side member 53 by a support 51b. The upper cross member 51 is able to turn relative to the left side member 53 about a left upper axis which passes through the support 51b to extend in the front-rear direction of the body frame 21.

A right end of the upper cross member 51 is supported on the right side member 54 by a support 51c. The upper cross member 51 is able to turn relative to the right side member 54 about a right upper axis which passes through the support 51c to extend in the front-rear direction of the body frame 21.

An intermediate portion of the lower cross member 52 is supported on the head pipe 211 by a support 52a. The lower cross member 52 is able to turn about an intermediate lower axis which passes through the support 52a to extend in the front-rear direction of the body frame 21.

A left end of the lower cross member 52 is supported on the left side member 53 by a support 52b. The lower cross member 52 is able to turn about a left lower axis which passes through the support 52b to extend in the front-rear direction of the body frame 21.

A right end of the lower cross member 52 is supported on the right side member 54 by a support 52c. The lower cross member 52 is able to turn about a right lower axis which passes through the support 52c to extend in the front-rear direction of the body frame 21.

The intermediate upper axis, the right upper axis, the left upper axis, the intermediate lower axis, the right lower axis, and the left lower axis extend parallel or substantially parallel to one another. The intermediate upper axis, the right upper axis, the left upper axis, the intermediate lower axis, the right lower axis and the left lower axis are disposed above the left front wheel 31 and the right front wheel 32 in the up-down direction of the body frame 21.

Figure 3:
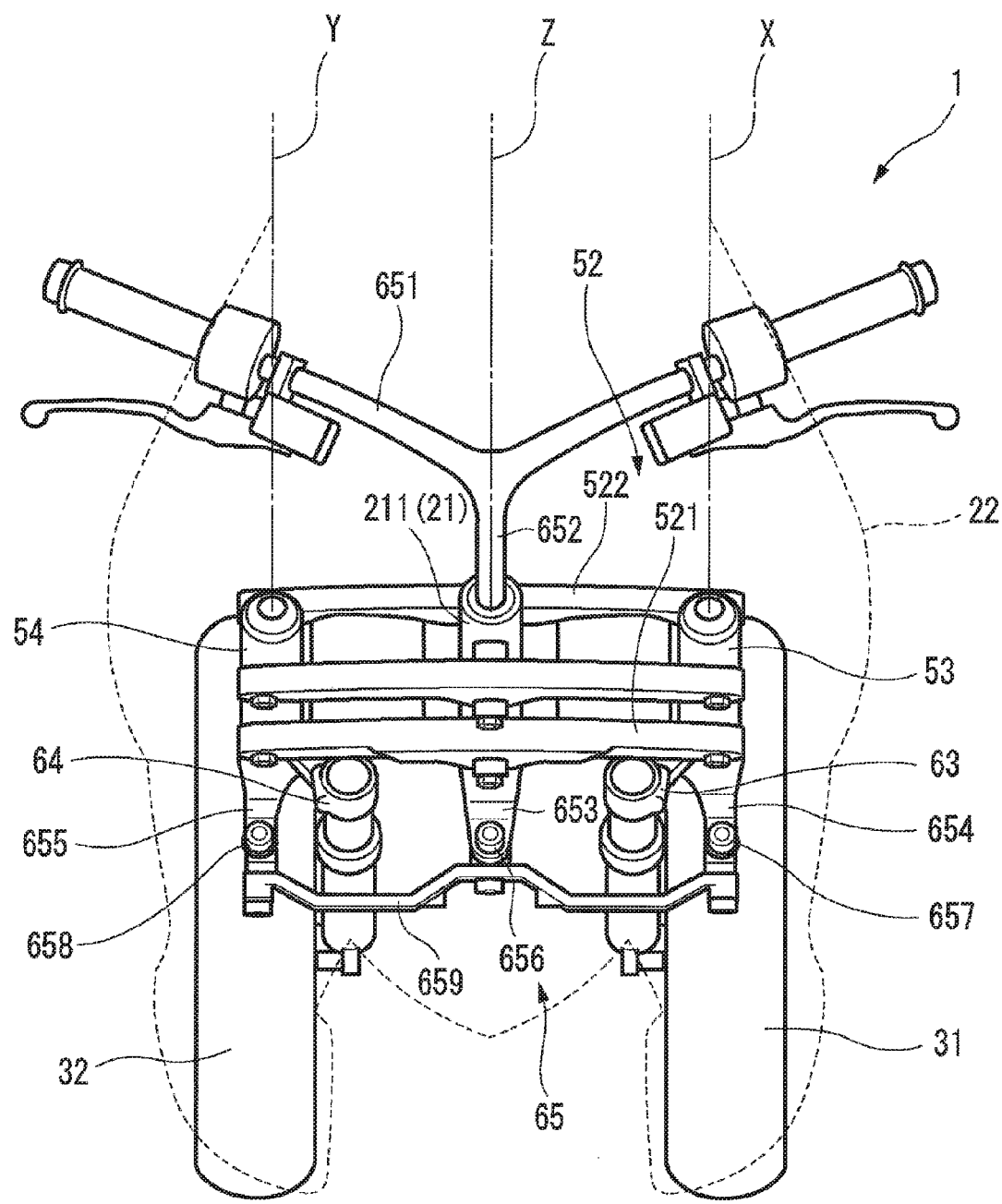
FIG. 3 is a plan view showing the front portion of the vehicle shown in FIG. 1.

FIG. 3 is a plan view of the front portion of the vehicle 1 as viewed from above in the up-down direction of the body frame 21. In FIG. 3, the body frame 21 is in the upright state. The following description which refers to FIG. 3 will be made on the premise that the body frame 21 is in the upright state. In FIG. 3, the vehicle 1 is depicted as seen through the body cover 22 which is indicated by dashed lines.

The upper cross member 51 is disposed ahead of the head pipe 211 in the front-rear direction of the body frame 21. The upper cross member 51 is a plate-shaped member that extends in the left-right direction of the vehicle body frame 21.

The lower cross member 52 includes a front plate-shaped member 521 and a rear plate-shaped member 522. The front plate-shaped member 521 is disposed ahead of the head pipe 211 in the front-rear direction of the body frame 21. The rear plate-shaped member 522 is disposed behind the head pipe 211 in the front-rear direction of the body frame 21. The front plate-shaped member 521 and the rear plate-shaped member 522 extend in the left-right direction of the body frame 21. The lower cross member 52 is disposed below the upper cross member 51 in the up-and-down direction of the body frame 21. A lengthwise dimension of the lower cross member 52 in relation to the left-right direction of the body frame 21 is exactly or almost the same as a lengthwise dimension of the upper cross member 51 in relation to the left-right direction of the body frame 21. The lower cross member 52 extends parallel or substantially parallel to the upper cross member 51.

As shown in FIGS. 2 and 3, the left side member 53 is disposed directly on the left of the head pipe 211 in the left-right direction of the body frame 21. The left side member 53 is disposed above the left front wheel 31 in the up-down direction of the body frame 21. The left side member 53 extends in a direction in which the head pipe 211 extends. The left side member 53 extends in a direction in which the intermediate steering axis Z of the steering shaft 652 extends. An upper portion of the left side member 53 is disposed behind a lower portion thereof in the front-rear direction of the body frame 21.

The left bracket 63 includes a not-shown left turning member at an upper portion thereof. The left turning member is disposed in an interior of the left side member 53 and extends in the same orientation as the direction in which the left side member 53 extends. The left turning member is able to turn about the left steering axis X relative to the left side member 53. Namely, the left bracket 63 is able to turn about the left steering axis X relative to the left side member 53. The left steering axis X extends in the direction in which the left side member 53 extends. As shown in FIG. 2, the left steering axis X extends parallel or substantially parallel to the intermediate steering axis Z of the steering shaft 652 in the up-down direction of the body frame 21. As shown in FIG. 3, the left steering axis X extends parallel or substantially parallel to the intermediate steering axis Z of the steering shaft 652 in the front-rear direction of the body frame 21.

As shown in FIGS. 2 and 3, the right side member 54 is disposed directly on the right of the head pipe 211 in the left-right direction of the body frame 21. The right side member 54 is disposed above the right front wheel 32 in the up-down direction of the body frame 21. The right side member 54 extends in the direction in which the head pipe 211 extends. The right side member 54 extends in the direction in which the intermediate steering axis Z of the steering shaft 652 extends. An upper portion of the right side member 54 is disposed behind a lower portion thereof in the front-rear direction of the body frame 21.

The right bracket 64 includes a not-shown right turning member at an upper portion thereof. The right turning member is disposed in an interior of the right side member 54 and extends in the same orientation as the direction in which the right side member 54 extends. The right turning member is able to turn about a right steering axis Y relative to the right side member 54. Namely, the right bracket 64 is able to turn about the right steering axis Y relative to the right side member 54. The right steering axis Y extends in the direction in which the right side member 54 extends. As shown in FIG. 2, the right steering axis Y extends parallel or substantially parallel to the intermediate steering axis Z of the steering shaft 652 in the up-down direction of the body frame 21. As shown in FIG. 3, the right steering axis Y extends parallel or substantially parallel to the intermediate steering axis Z of the steering shaft 652 in the front-rear direction of the body frame 21.

Thus, as has been described above, the upper cross member 51, the lower cross member 52, the left side member 53, and the right side member 54 are supported on the body frame 21 so that the upper cross member 51 and the lower cross member 52 are held in postures which are parallel or substantially parallel to each other and so that the left side member 53 and the right side member 54 are held in postures which are parallel or substantially parallel to each other.

As shown in FIGS. 2 and 3, the steering force transmission 65 includes, in addition to the handlebar 651 and the steering shaft 652 that have been described above, an intermediate transmission plate 653, a left transmission plate 654, a right transmission plate 655, an intermediate joint 656, a left joint 657, a right joint 658, and a tie rod 659.

The intermediate transmission plate 653 is connected to the lower portion of the steering shaft 652. The intermediate transmission plate 653 cannot turn relative to the steering shaft 652. The intermediate transmission plate 653 is able to turn about the intermediate turning axis Z of the steering shaft 652 relative to the head pipe 211.

The left transmission plate 654 is disposed directly on the left of the intermediate transmission plate 653. The left transmission plate 654 is connected to a lower portion of the left bracket 63. The left transmission plate 654 cannot turn relative to the left bracket 63. The left transmission plate 654 is able to turn about the left steering axis X relative to the left side member 53.

The right transmission plate 655 is disposed directly on the right of the intermediate transmission plate 653 in the left-right direction of the body frame 21. The right transmission plate 655 is connected to a lower portion of the right bracket 64. The right transmission plate 655 cannot turn relative to the right bracket 64. The right transmission plate 655 is able to turn about the right steering axis Y relative to the right side member 54.

As shown in FIG. 3, the intermediate joint 656 is connected to a front portion of the intermediate transmission plate 653 via a shaft that extends in the up-down direction of the body frame 21. The intermediate transmission plate 653 and the intermediate joint 656 are able to turn relatively about the shaft. The left joint 657 is disposed on the left of the intermediate joint 656 in the left-right direction of the body frame 21. The left joint 657 is connected to a front portion of the left transmission plate 654 via a shaft that extends in the up-down direction of the body frame 21. The left transmission plate 654 and the left joint 657 are able to turn relatively about the shaft. The right joint 658 is disposed on the right of the intermediate joint 656 in the left-right direction of the body frame 21. The right joint 658 is connected to a front portion of the right transmission plate 655 via a shaft that extends in the up-down direction of the body frame 21. The right transmission plate 655 and the right joint 658 are able to turn relatively about the shaft.

A shaft which extends in the front-rear direction of the body frame 21 is provided at a front portion of the intermediate joint 656. A shaft which extends in the front-rear direction of the body frame 21 is provided at a front portion of the left joint 657. A shaft which extends in the front-rear direction of the body frame 21 is provided at a front portion of the right joint 658. The tie rod 659 extends in the left-right direction of the body frame 21. The tie rod 659 is connected to the intermediate joint 656, the left joint 657, and the right joint 658 via those shafts. The tie rod 659 and the intermediate joint 656 are able to turn relatively about the shaft which is provided at the front portion of the intermediate joint 656. The tie rod 659 and the left joint 657 are able to turn relatively about the shaft which is provided at the front portion of the left joint 657. The tie rod 659 and the right joint 658 are able to turn relatively about the shaft which is provided at the front portion of the right joint 658.

The left transmission plate 654 is connected to the intermediate transmission plate 653 via the left joint 657, the tie rod 659, and the intermediate joint 656. The right transmission plate 655 is connected to the intermediate transmission plate 653 via the right joint 658, the tie rod 659, and the intermediate joint 656. The left transmission plate 654 and the right transmission plate 655 are connected to each other via the left joint 657, the tie rod 659, and the right joint 658.

Figure 4:
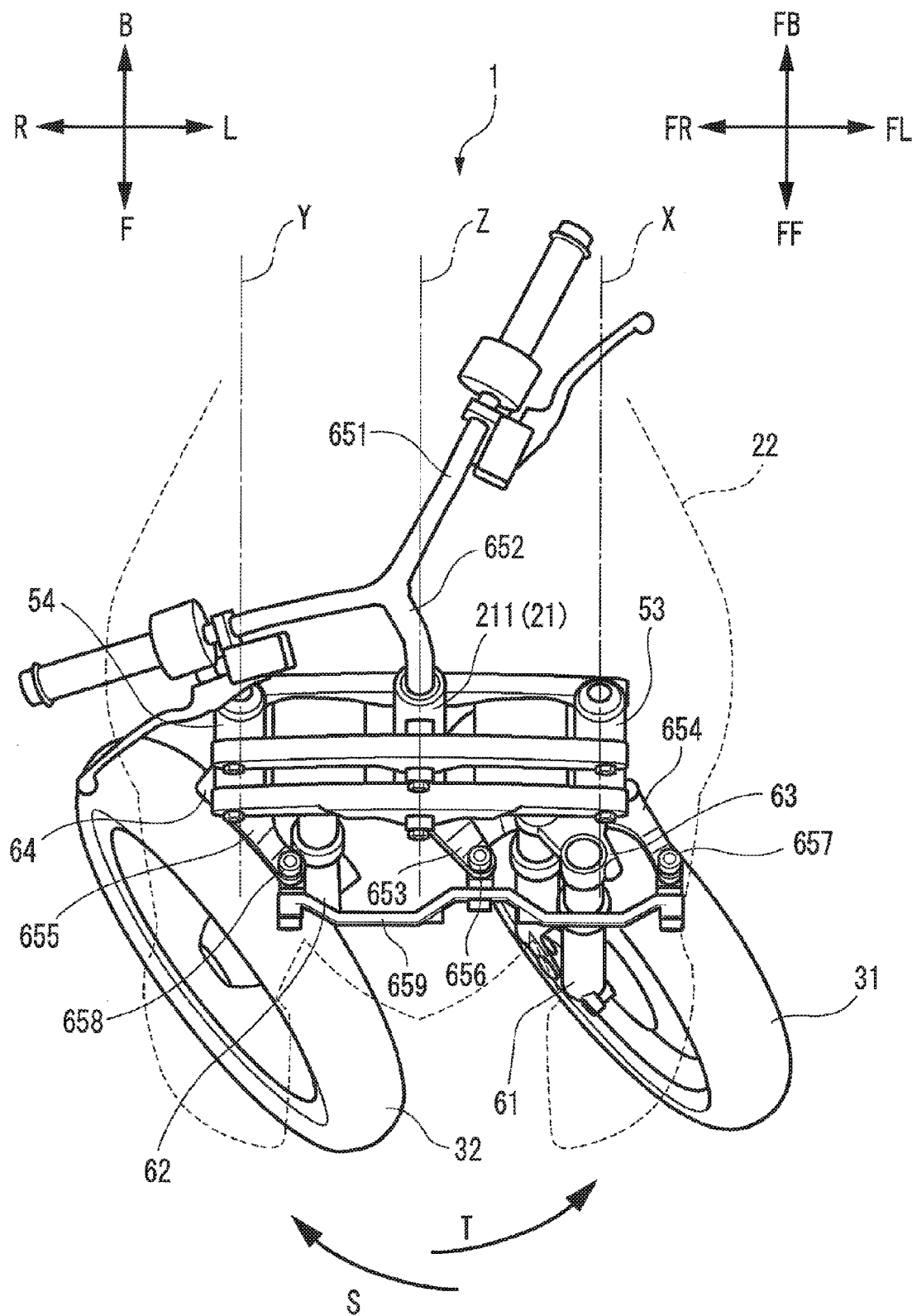
FIG. 4 is a plan view showing the front portion of the vehicle shown in FIG. 1 when the vehicle is steered.

Next, referring to FIGS. 3 and 4, a steering operation of the vehicle 1 will be described. FIG. 4 is a plan view of the front portion of the vehicle 1 in a condition that the left front wheel 31 and the right front wheel 32 are turned to the left, as viewed from above in the up-down direction of the body frame 21. In FIG. 4, the vehicle 1 is depicted as seen through the body cover 22 which is indicated by dashed lines.

When the rider operates the handlebar 651, the steering shaft 652 turns about the intermediate steering axis Z relative to the head pipe 211. In the case of steering to the left as shown in FIG. 4, the steering shaft 652 turns in a direction indicated by an arrow T. In association with the turning of the steering shaft 652, the intermediate transmission plate 653 turns in the direction indicated by the arrow T about the intermediate steering axis Z relative to the head pipe 211.

In association with the turning of the intermediate transmission plate 653 in the direction indicated by the arrow T, the intermediate joint 656 of the tie rod 659 turns relative to the intermediate transmission plate 653 in a direction indicated by an arrow S. The tie rod 659 moves leftward in the left-right direction of the body frame 21 and to the rear in the front-rear direction of the body frame 21 while maintaining its posture.

In association with the movement of the tie rod 659, the left joint 657 and the right joint 658 of the tie rod 659 turn in the direction indicated by the arrow S relative to the left transmission plate 654 and the right transmission plate 655, respectively. This causes the left transmission plate 654 and the right transmission plate 655 to turn in the direction indicated by the arrow T while the tie rod 659 maintains its posture as it is.

When the left transmission plate 654 turns in the direction indicated by the arrow T, the left bracket 63, which cannot turn relative to the left transmission plate 654, turns in the direction indicated by the arrow T about the left steering axis X relative to the left side member 53.

When the right transmission plate 655 turns in the direction indicated by the arrow T, the right bracket 64, which cannot turn relative to the right transmission plate 655, turns in the direction indicated by the arrow T about the right steering axis Y relative to the right side member 54.

When the left bracket 63 turns in the direction indicated by the arrow T, the left shock absorber 61, which is connected to the left bracket 63, turns in the direction indicated by the arrow T about the left steering axis X relative to the left side member 53. When the left shock absorber 61 turns in the direction indicated by the arrow T, the left front wheel 31, which is supported on the left shock absorber 61 via the left support 61b, turns in the direction indicated by the arrow T about the left steering axis X relative to the left side member 53.

When the right bracket 64 turns in the direction indicated by the arrow T, the right shock absorber 62, which is supported on the right bracket 64, turns in the direction indicated by the arrow T about the right steering axis Y relative to the right side member 54. When the right shock absorber 62 turns in the direction indicated by the arrow T, the right front wheel 32, which is supported on the right shock absorber 62 via the right support 62b, turns in the direction indicated by the arrow T about the right steering axis Y relative to the right side member 54.

When the rider operates the handlebar 651 so as to steer to the right, the elements described above turn in opposite directions to the directions in which they turn when the vehicle turns to the left. Since the elements move the other way around in relation to the left-right direction, the detailed description thereof will be omitted here.

Thus, as has been described above, the steering mechanism 6 transmits the steering force to the left front wheel 31 and the right front wheel 32 in response to the operation of the handlebar 651 by the rider. The left front wheel 31 and the right front wheel 32 turn about the left steering axis X and the right steering axis Y, respectively, in the direction corresponding to the direction in which the handlebar 651 is operated by the rider.

Figure 5:
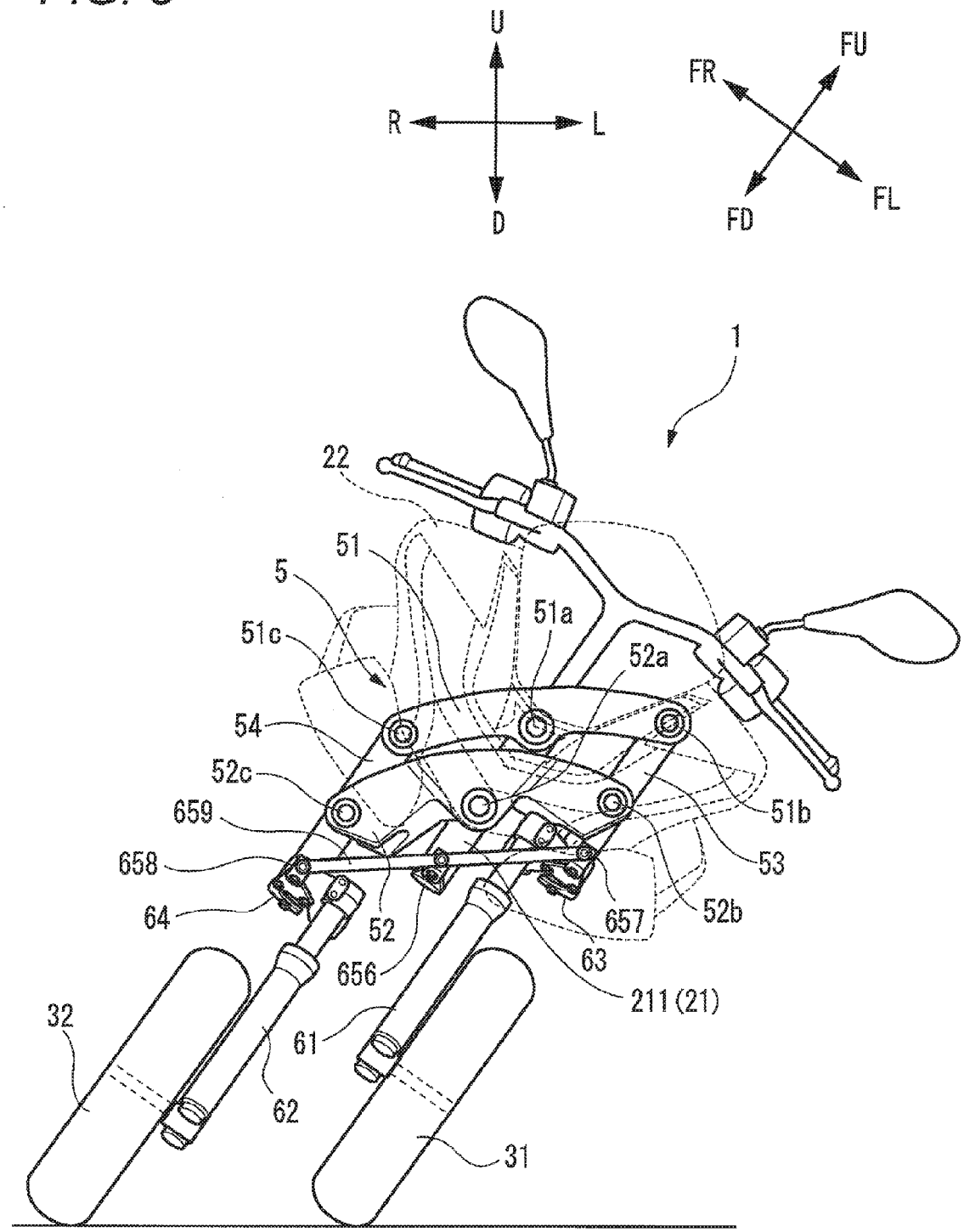
FIG. 5 is a front view showing the front portion of the vehicle shown in FIG. 1 when the vehicle is caused to lean.

Next, referring to FIGS. 2 and 5, a leaning operation of the vehicle 1 will be described. FIG. 5 is a front view of the front portion of the vehicle 1 as viewed from the front in the front-rear direction of the body frame 21 is in the condition that the body frame 21 leans leftward of the vehicle 1. In FIG. 5, the vehicle 1 is depicted as seen through the body cover 22 which is indicated by dashed lines.

As shown in FIG. 2, when the vehicle 1 is viewed from the front of the body frame 21 in the condition that the body frame 21 is in an upright state, the linkage 5 has a rectangular or substantially rectangular shape. As shown in FIG. 5, when the vehicle 1 is viewed from the front of the body frame 21 in the condition that the body frame 21 leans, the linkage 5 has a parallelogram shape. The operation of the linkage 5 is interlocked with the leaning of the body frame 21 in the left-right direction. The operation of the linkage 5 means that the upper cross member 51, the lower cross member 52, the left side member 53, and the right side member 54 which make up the linkage 5 turn relatively about turning axes which pass through the corresponding supports 51a, 51b, 51c, 52a, 52b, 52c such that the shape of the linkage 5 changes.

For example, as shown in FIG. 5, when the rider causes the vehicle 1 to lean leftward, the head pipe 211 leans leftward from the vertical direction. When the head pipe 211 leans, the upper cross member 51 turns about the intermediate upper axis which passes through the support 51a counterclockwise when viewed from the front of the vehicle 1 relative to the head pipe 211. Similarly, the lower cross member 52 turns about the intermediate lower axis which passes through the support 52a counterclockwise when viewed from the front of the vehicle 1 relative to the head pipe 211. This causes the upper cross member 51 to move leftward in the left-right direction of the body frame 21 relative to the lower cross member 52.

When the upper cross member 51 moves in this way, the upper cross member 51 turns counterclockwise when viewed from the front of the vehicle 1 about the left upper axis that passes through the support 51b and the right upper axis that passes through the support 51c relative to the left side member 53 and the right side member 54, respectively. Similarly, the lower cross member 52 turns counterclockwise when viewed from the front of the vehicle 1 about the left lower axis which passes through the support 52b and the right lower axis which passes through the support 52c relative to the left side member 53 and the right side member 54, respectively. This causes the left side member 53 and the right side member 54 to lean leftward of the vehicle 1 from the vertical direction while holding their postures parallel to the head pipe 211.

As this occurs, the lower cross member 52 moves leftward in the left-right direction of the body frame 21 relative to the tie rod 659. As the lower cross member 52 moves leftward, the shafts which are provided at the front portions of the intermediate joint 656, the left joint 657, and the right joint 658 turn relative to the tie rod 659. This allows the tie rod 659 to hold a parallel or substantially parallel posture to the upper cross member 51 and the lower cross member 52.

As the left side member 53 leans leftward of the vehicle 1, the left bracket 63 that is supported on the left side member 53 via the left turning member leans leftward of the vehicle 1. In association with the leftward leaning of the left bracket 63, the left shock absorber 61 that is supported on the left bracket 63 also leans leftward of the vehicle 1. As the left shock absorber 61 leans leftward of the vehicle 1, the left front wheel 31 supported on the left shock absorber 61 leans leftward of the vehicle 1 while holding its posture that is parallel or substantially parallel to the head pipe 211.

As the right side member 54 leans leftward of the vehicle 1, the right bracket 64 that is supported on the right side member 54 via the right turning member leans leftward of the vehicle 1. In association with the leftward leaning of the right side member 54, the right shock absorber 62 that is supported on the right bracket 64 also leans leftward of the vehicle 1. As the right shock absorber 64 leans leftward of the vehicle 1, the right front wheel 32 supported on the right shock absorber 62 leans leftward of the vehicle 1 while holding its posture that is parallel or substantially parallel to the head pipe 211.

The description of the leaning operation of the left front wheel 31 and the right front wheel 32 is based on the vertical direction. However, when the vehicle 1 leans (when the linkage 5 is actuated to operate), the up-down direction of the body frame 21 does not coincide with the vertical direction. In the event of this being described based on the up-down direction of the body frame 21, when the linkage 5 is actuated to operate, the left front wheel 31 and the right front wheel 32 change their relative position in the up-down direction of the body frame 21. In other words, the linkage 5 changes the relative position of the left front wheel 31 and the right front wheel 32 in the up-down direction of the body frame 21 to cause the body frame 21 to lean leftward or rightward of the vehicle 1 from the vertical direction.

When the rider causes the vehicle 1 to lean rightward, the elements lean rightward. Since the elements move the other way around in relation to the left-right direction, the detailed description thereof will be omitted here.

Figure 6:
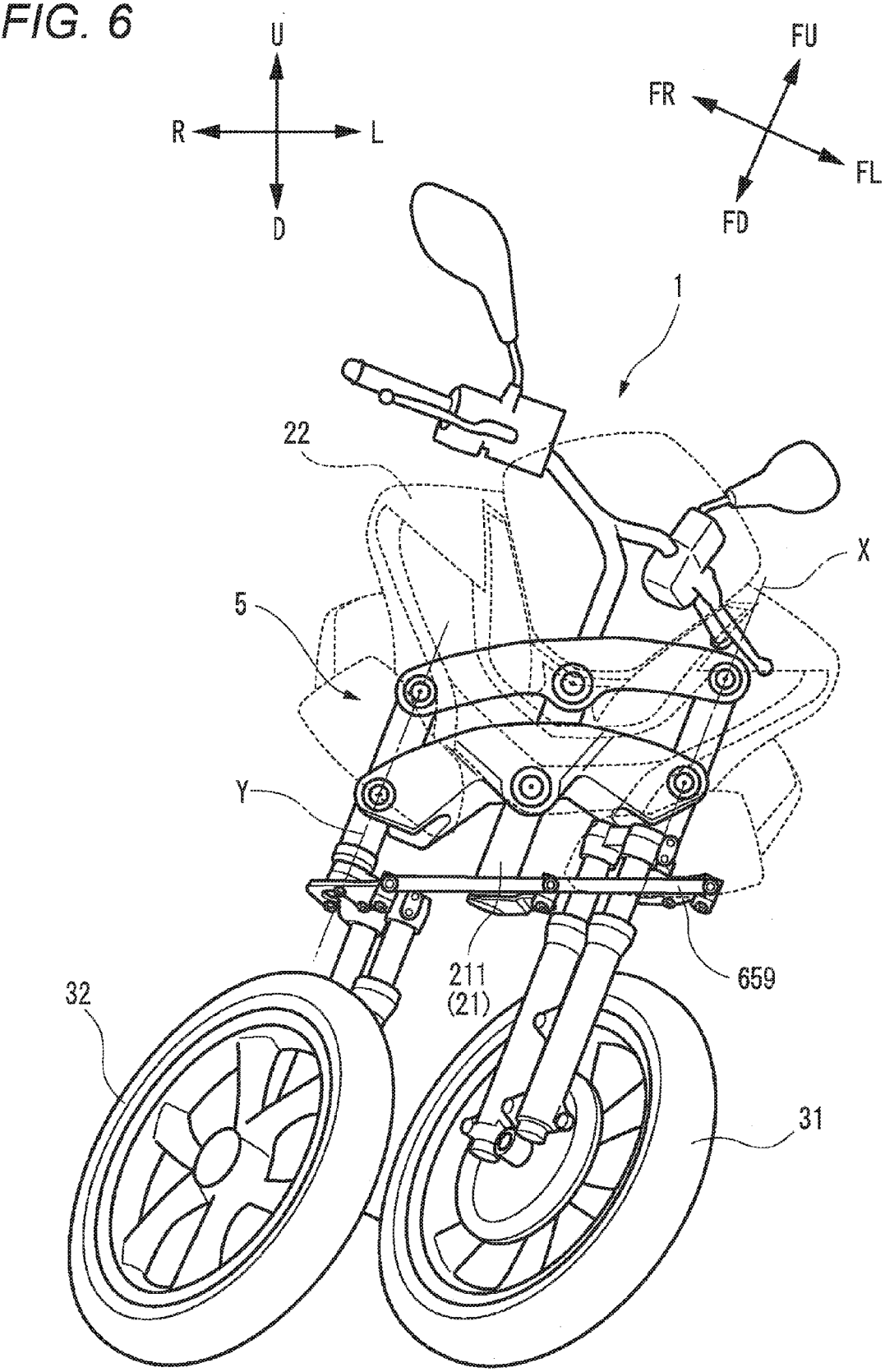
FIG. 6 is a front view showing the front portion of the vehicle shown in FIG. 1 when the vehicle is caused to lean and is steered.

FIG. 6 is a front view of the front portion of the vehicle 1 as viewed from the front in the front-rear direction of the body frame 21 in the condition that the vehicle 1 is caused to lean and turned. FIG. 6 shows a state that the vehicle 1 is steered or turned to the left while leaning leftward. In FIG. 6, the vehicle 1 is depicted as seen through the body cover 22 which is indicated by dashed lines.

When a steering operation is performed, the left front wheel 31 is turned counterclockwise about the left steering axis X, while the right front wheel 32 is turned counterclockwise about the right steering axis Y. When a leaning operation is performed, the left front wheel 31 and the right front wheel 32 lean leftward of the vehicle 1 together with the body frame 21. Namely, in this state, the linkage 5 exhibits the parallelogram shape. The tie rod 659 moves leftward in the left-right direction of the body frame 21 and to the rear in the front-rear direction of the body frame 21 from the position where the body frame 21 is in the upright state.

The inventor of the present invention studied whether or not the front portion of the vehicle 1 is restricted from being enlarged in size while increasing the leaning angle of the body frame 21 in the left-right direction of the vehicle 1 by using a different system from the leading arm mechanism in the vehicle 1 including the leanable body frame 21 and the two front wheels 3 that are arranged side by side in the left-right direction of the body frame 21. When referred to herein, the "front portion of the vehicle 1" means the portion of the vehicle 1 that is positioned ahead of the seat 23 in the front-rear direction of the body frame 21. Specifically, the inventor of the present invention studied the use of the linkage 5 that is a parallelogram linkage system.

The linkage 5 is supported on the body frame 21 at the head pipe 211 (an example of the link support). As has been described above, the linkage 5 includes the left side member 53, the right side member 54, and the upper cross member 51 (an example of the cross member). The left side member 53 is disposed on the left of the head pipe 211 in relation to the left-right direction of the body frame 21. At least a portion of the left side member 53 is disposed directly above the left front wheel 31 in the up-down direction of the body frame 21 when the vehicle 1 is viewed from the left-right direction of the body frame 21. The right side member 54 is disposed on the right of the head pipe 211 in relation to the left-right direction of the body frame 21. At least a portion of the right side member 54 is disposed directly above the right front wheel 32 in the up-down direction of the body frame 21 when the vehicle 1 is viewed from the left-right direction of the body frame 21. A left portion of the upper cross member 51 is supported on the left side member 53 at the support 51b so as to turn about a left upper axis (an example of the left turning axis) that extends in the front-rear direction of the body frame 21. A right portion of the upper cross member 51 is supported on the right side member 54 at the support 51c so as to turn about a right upper axis (an example of the right turning axis) that extends in the front-rear direction of the body frame 21. An intermediate portion of the upper cross member 51 is supported on the head pipe 211 at the support 51a so as to turn about an intermediate upper axis (an example of the intermediate turning axis) that extends in the front-rear direction of the body frame 21. The linkage 5 changes the relative position of the left front wheel 31 and the right front wheel 32 in the up-down direction of the body frame 21 to cause the body frame 21 to lean leftward or rightward of the vehicle 1 as the upper cross member 51 turns about the intermediate upper axis.

In this linkage 5, the upper cross member 51 operates so as to permit the displacement of the left front wheel 31 and the right front wheel 32 in the up-down direction of the body frame 21 and extends in the left-right direction of the body frame 21. Additionally, at least portions of the left side member 53 and the right side member 54, which are displaced in opposite directions in relation to the up-down direction of the body frame 21 as the upper cross member 51 turns, are disposed directly above the left front wheel 31 and the right front wheel 32, respectively, in the up-down direction of the body frame 21 when the vehicle 1 is viewed from the left-right direction of the body frame 21. This configuration significantly reduces or prevents the increase in the overall dimension of the vehicle 1 in the front-rear direction of the body frame 21 even though the movable range of the linkage 5 in the up-down direction of the body frame 21 is increased in order to increase the leaning angle of the body frame 21 in the left-right direction of the vehicle 1.

Figure 7:
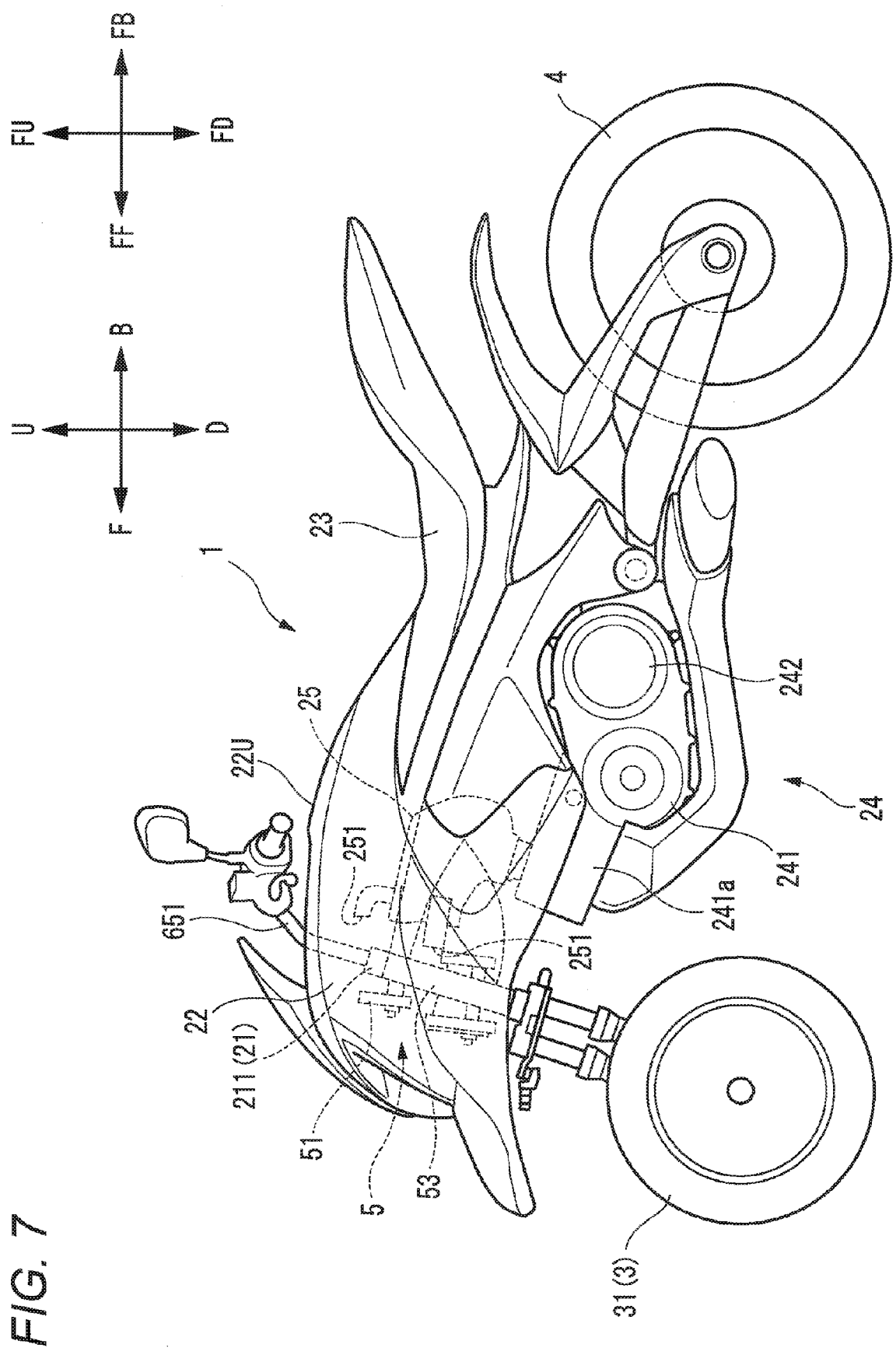
FIG. 7 is a left side view wherein the entire vehicle of FIG. 1 is viewed from the left thereof.
Figure 8:
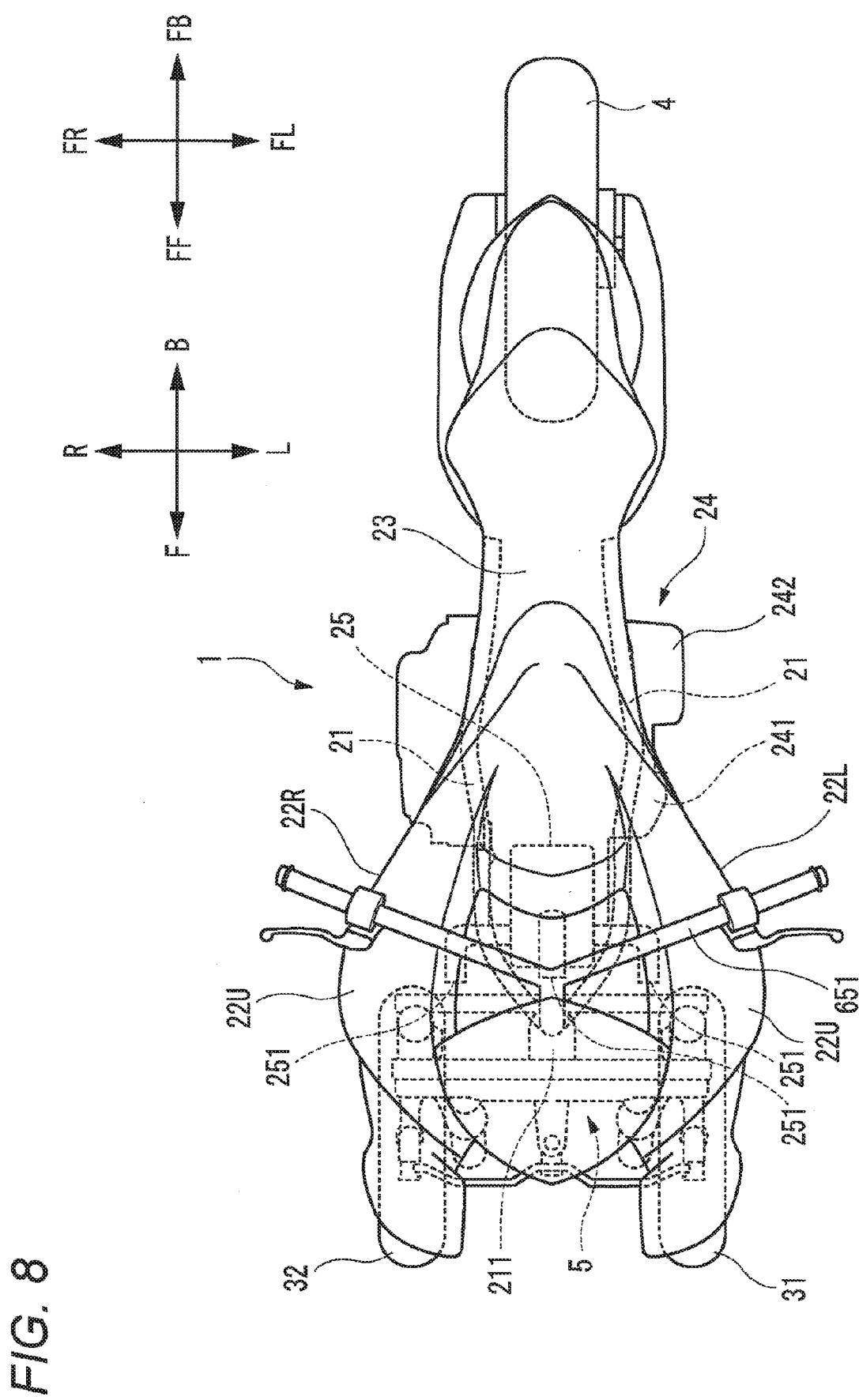
FIG. 8 is a plan view of the entire vehicle of FIG. 1, viewed from above thereof.

FIG. 7 is a left side view of the entire vehicle 1 when viewed from the left in the left-right direction of the body frame 21. In FIG. 7, the body frame 21 is in the upright state. The following description which refers to FIG. 7 will be made on the premise that the body frame 21 is in the upright state. FIG. 8 is a plan view of the entire vehicle 1 when viewed from the above in the up-down direction of the body frame 21. In FIG. 8, the body frame 21 is in the upright state. The following description which refers to FIG. 8 will be made on the premise that the body frame 21 is in the upright state.

As shown in FIG. 7, the power drive 24 including the engine 241 and the transmission 242 is disposed ahead of a front end of the rear wheel 4 in the front-rear direction of the body frame 21 when the vehicle 1 is viewed from the left-right direction of the body frame 21. The power drive 24 including the engine 241 and the transmission 242 is disposed behind respective rear ends of the two front wheels 3 in the front-rear direction of the body frame 21 when the vehicle 1 is viewed from the left-right direction of the body frame 21. An air cleaner 25 through which air passes to be supplied to the engine 241 is disposed above the transmission 242 in the up-down direction of the body frame 21. The air cleaner 25 is disposed directly above a cylinder portion 241a of the engine 241.

As shown in FIGS. 7 and 8, the air cleaner 25 is disposed ahead of a rear end of the power drive 24 in the front-rear direction of the body frame 21. The air cleaner 25 is disposed ahead of the seat 23 on which the rider sits in the front-rear direction of the body frame 21. The air cleaner 25 is disposed ahead of the transmission 242 in the front-rear direction of the body frame 21. A front end of the air cleaner 25 is disposed ahead of the engine 241 in the front-rear direction of the body frame 21. The air cleaner 25 is disposed directly behind the head pipe 211 in the front-rear direction of the body frame. The air cleaner 25 is disposed directly behind the linkage 5 in the front-rear direction of the body frame. As shown in FIG. 8, the air cleaner 25 is disposed at a center in the left-right direction of the body frame 21.

The air cleaner 25 includes an intake port 251. The air cleaner 25 includes a plurality of intake ports 251. The intake ports 251 are opened to the front in the front-rear direction of the body frame 21.

Figure 9:
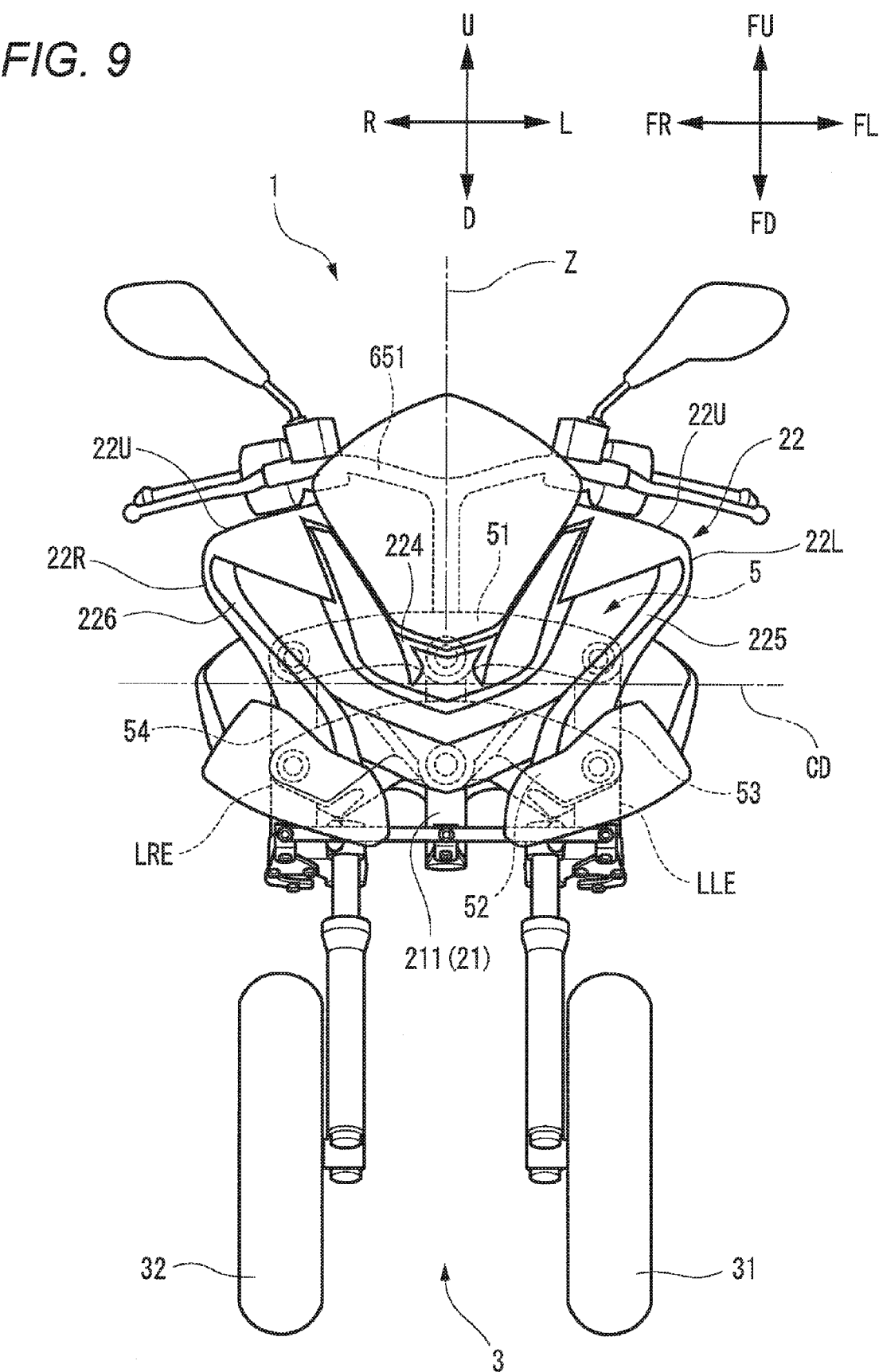
FIG. 9 is a front view showing a front portion of the vehicle of FIG. 1.
Figure 10:
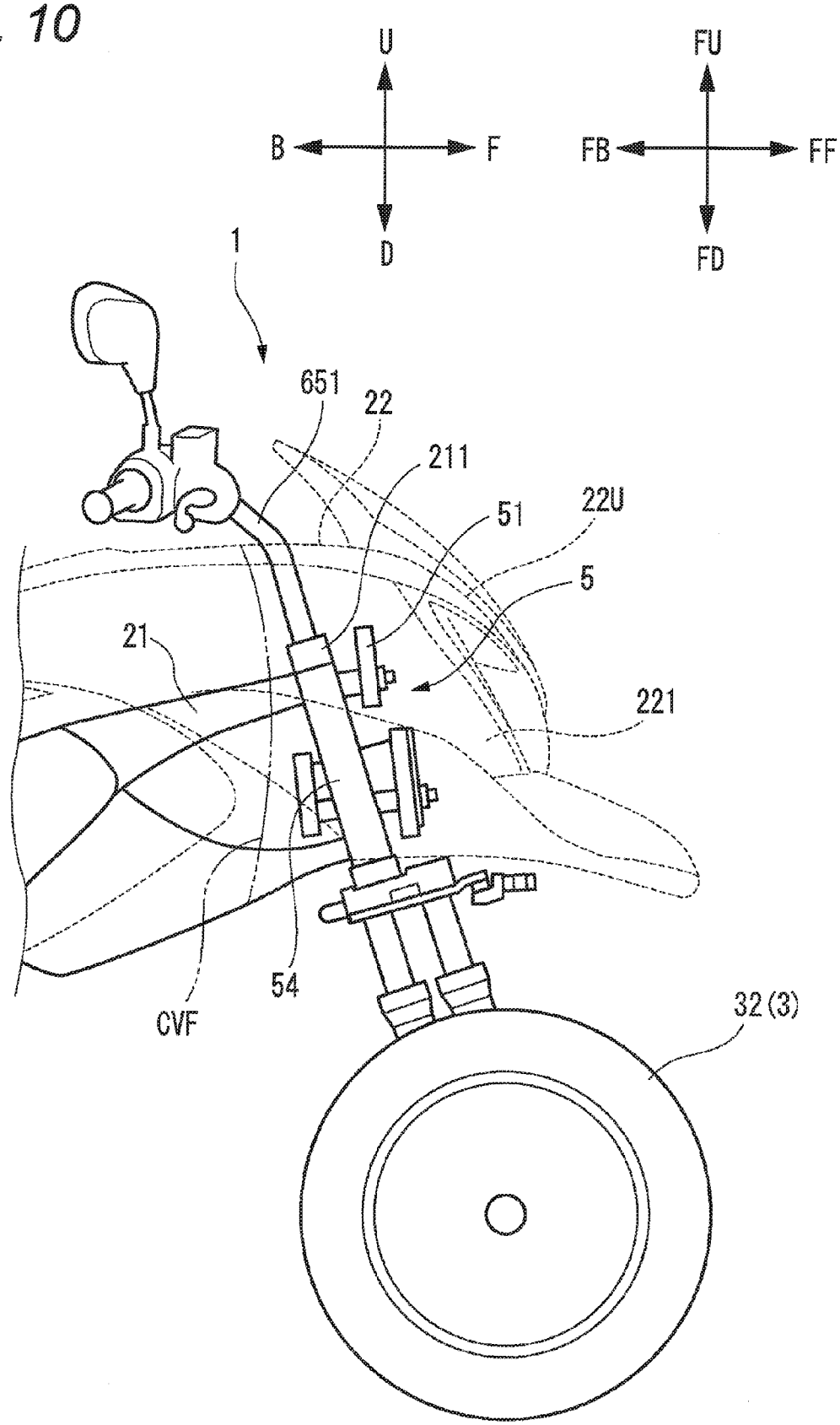
FIG. 10 is a right side view of the front portion of the vehicle of FIG. 1, viewed from the right thereof.

FIG. 9 is a front view of the front portion of the vehicle 1 as viewed from the front in the front-rear direction of the body frame 21. In FIG. 9, the body frame 21 is in the upright state. The following description which refers to FIG. 9 will be made on the premise that the body frame 21 is in the upright state. FIG. 10 is a right side view of the front portion of the vehicle 1 as viewed from the right in the left-right direction of the body frame 21. In FIG. 10, the body frame 21 is in the upright state. The following description which refers to FIG. 10 will be made on the premise that the body frame 21 is in the upright state. In FIG. 10, the front portion is shown as seen through the body cover 22 that is indicated by dashed lines.

As shown From FIGS. 7 to 10, the body cover 22 includes a wind guiding cover. The wind guiding cover includes a left wind guiding cover 22L, a right wind guiding cover 22R, and an upper wind guiding cover 22U. Namely, the left wind guiding cover 22L, the right wind guiding cover 22R, and the upper wind guiding cover 22U are disposed so as not to be movable relative to the body frame 21. The wind guiding cover includes a portion that extends across the handlebar 651 in the front-rear direction of the body frame 21 below the handlebar 651 in the up-down direction of the body frame 21 when the vehicle 1 is viewed from the above in the up-down direction of the body frame 21. The wind guiding cover defines a space where air is guided to the air cleaner 25.

A portion of the left wind guiding cover 22L, a portion of the right wind guiding cover 22R, and a portion of the upper wind guiding cover 22U make up a portion of the front cover 221. Namely, the left wind guiding cover 22L, the right wind guiding cover 22R, and the upper wind guiding cover 22U include portions that are disposed ahead of the linkage 5 in the front-rear direction of the body frame 21. The left wind guiding cover 22L, the right wind guiding cover 22R, and the upper wind guiding cover 22U include portions that are disposed behind of the linkage 5 in the front-rear direction of the body frame 21.

The left wind guiding cover 22L is disposed on the left of the head pipe 211 in the left-right direction of the body frame 21. The right wind guiding cover 22R is disposed on the right of the head pipe 211 in the left-right direction of the body frame 21. As shown in FIG. 8, a space between the left wind guiding cover 22L and the right wind guiding cover 22R at a portion behind the handlebar 651 in the front-rear direction of the body frame 21 and ahead of a rear end of the air cleaner 25 in the front-rear direction of the body frame 21 increases towards the front in the front-rear direction of the body frame 21 when the vehicle 1 is in the condition that the body frame 21 is in the upright state and is viewed from the up-down direction of the body frame 21. As shown in FIG. 8, the space between the left wind guiding cover 22L and the right wind guiding cover 22R increases from the air cleaner 25 towards the front in the front-rear direction of the body frame 21 when the vehicle 1 is in the condition that the body frame 21 is in the upright state and is viewed from the up-down direction of the body frame 21. The space between the left wind guiding cover 22L and the right wind guiding cover 22R decreases towards a front end of the front cover 221 at a portion ahead of the handlebar 651 in the front-rear direction of the body frame 21 when the vehicle 1 is in the condition that the body frame 21 is in the upright state and is viewed from the up-down direction of the body frame 21.

As shown in FIG. 9, the upper wind guiding cover 22U is positioned above a lower end CD of the upper cross member 51 in the up-down direction of the body frame 21. As shown in FIG. 7, when the vehicle 1 is in the condition that the body frame 21 is in the upright state and is viewed from the left-right direction of the body frame 21, the upper wind guiding cover 22U extends upwards in the up-down direction of the body frame 21 with an increasing distance from the air cleaner 25 towards the front in the front-rear direction of the body frame 21 at a portion located behind the handlebar 651 in the front-rear direction of the body frame 21 and ahead of the rear end of the air cleaner 25 in the front-rear direction of the body frame 21. When the vehicle 1 is in the condition that the body frame 21 is in the upright state and is viewed from the left-right direction of the body frame 21, the upper wind guiding cover 22U extends almost parallel to the front-rear direction of the body frame 21 at a portion located directly below the handlebar 651 in the up-down direction of the body frame 21. When the vehicle 1 is in the condition that the body frame 21 is in the upright state and is viewed from the left-right direction of the body frame 21, the upper wind guiding cover 22U extends downwards towards a front end of the front cover 221 in the up-down direction of the body frame 21 at a portion located ahead of the handlebar 651 in the front-rear direction of the body frame 21.

The front cover 221, which is an example of the wind guiding cover, includes an opening. The opening is disposed ahead of the linkage 5 in the front-rear direction of the body frame 21. Specifically, as shown in FIG. 9, the opening includes an intermediate opening 224, a left opening 225, and a right opening 226. Namely, the intermediate opening 224, the left opening 225, and the right opening 226 are disposed ahead of the linkage 5 in the front-rear direction of the body frame 21. At least a portion of the intermediate opening 224 is disposed ahead of the head pipe 211 in the front-rear direction of the body frame 21. The left opening 225 is disposed on the left of the intermediate opening 224 in the left-right direction of the body frame 21. The right opening 226 is disposed on the right of the intermediate opening 224 in the left-right direction of the body frame 21. An air flow that is received by the front portion of the vehicle 1 in motion partially enters an interior of the body cover 22 from the intermediate opening 224, the left opening 225, and the right opening 226.

The air cleaner 25 allows an amount of air that is required by the engine 241 to pass therethrough. The inventor of the present invention considered the risk that the air guided to the air cleaner 25 is interrupted because the movable range of the linkage 5 is wide when the vehicle 1 is viewed from the front-rear direction of the body frame 21. In particular, in the sport-type vehicle of which the body frame 21 leans in the left-right direction of the vehicle 1 at a great leaning angle, the movable range of the linkage 5 becomes wide. Because of this, the inventor of the present invention considered that in the sport-type vehicle, the air guided to the air cleaner 25 is interrupted remarkably.

Figure 11:
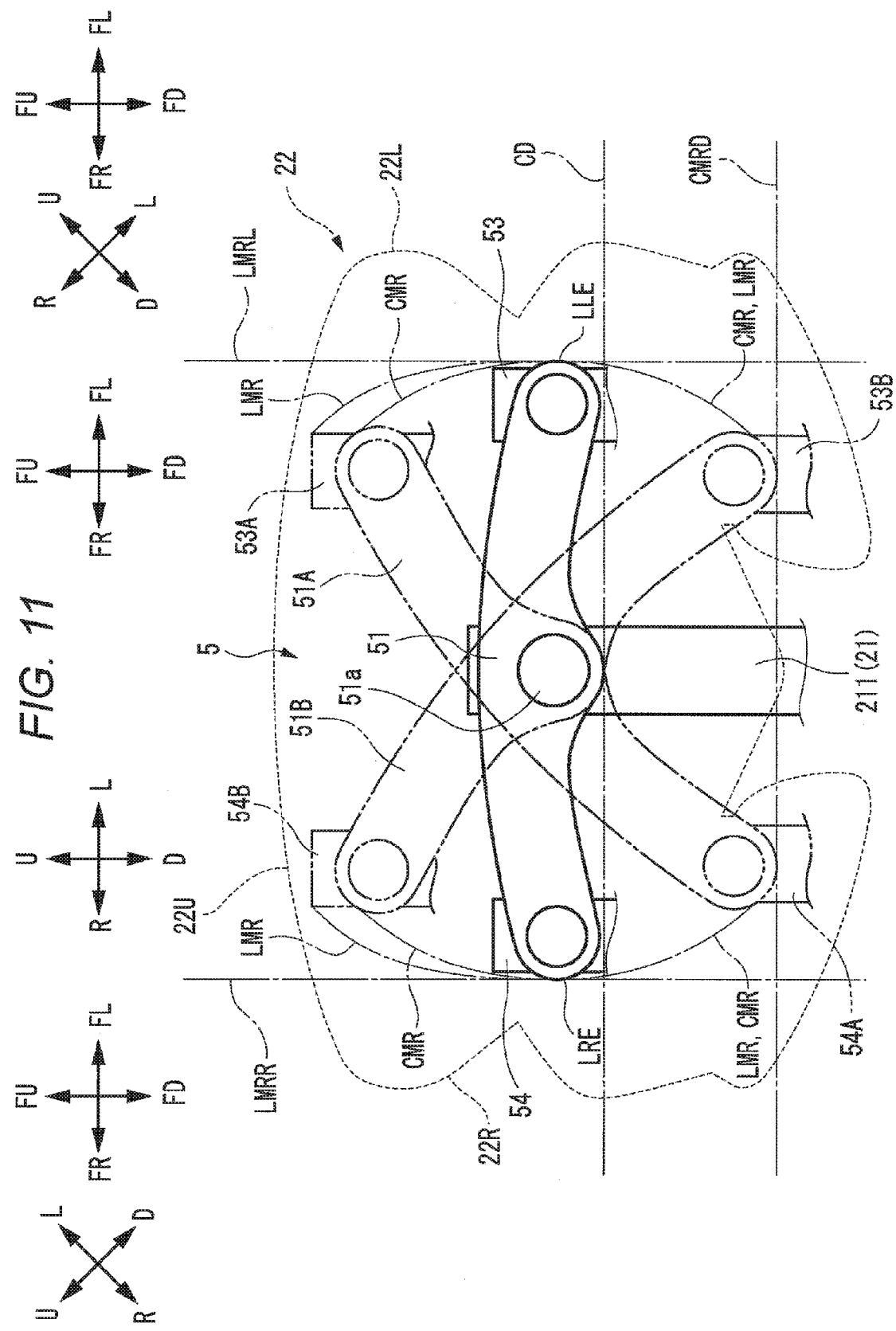
FIG. 11 is a front view schematically showing relative displacement of the linkage and the body cover when the vehicle of FIG. 1 is caused to lean.

FIG. 11 is a schematic diagram illustrating a relative displacement of the linkage 5 and the body cover 22 when the body frame 21 leans in the left-right direction of the vehicle 1. In FIG. 11, a cross section of the body cover 22 taken along a plane that includes the upper cross member 51 in the front-rear direction of the body frame 21 is indicated by a dashed line. The left side member 53 and the right side member 54 are partially omitted from the illustration for the sake of giving priority to an easy visual understanding. As has been described by reference to FIG. 5, when the body frame 21 leans, the up-down directions FU, FD of the body frame 21 are inclined obliquely relative to the up and down directions U, D of the vehicle 1. In FIG. 11, the up-down directions FU, FD of the body frame 21 are fixed. Namely, in FIG. 11, even though the linkage 5 operates, the postures of the head pipe 211, which is a portion of the body frame 21, and the body cover 22, which is disposed so as not to be movable relative to the body frame 21 do not change within a plane that intersects the front-rear direction of the body frame 21 at right angles. On the other hand, as the body frame 21 leans, the postures and positions of the upper cross member 51, the right side member 54, and the left side member 53, which are disposed so as to be movable relative to the body frame 21, change within the plane that intersects the front-rear direction of the body frame 21 at right angles.

Specifically, the upper cross member 51, the left side member 53, the right side member 54, and the head pipe 211 which are indicated by solid lines represent their positions when the body frame 21 is in the upright state. The up-down and left-right directions of the vehicle 1 in this state are shown on the upper center of FIG. 11. An upper cross member 51A, a left side member 53A, and a right side member 54A which are indicated by dashed chain lines represent their positions when the body frame 21 leans leftward of the vehicle 1. A relationship between the up-down and left-right directions of the vehicle 1 and the up-down and left-right directions of the body frame 21 in this state is shown on the upper left of FIG. 11. An upper cross member 51B, a left side member 53B, and a right side member 54B which are indicated by dashed chain lines represent their positions when the body frame 21 leans rightward of the vehicle 1. A relationship between the up-down and left-right directions of the vehicle 1 and the up-down and left-right directions of the body frame 21 in this state is shown on the upper right of FIG. 11.

As shown in FIG. 11, when the body frame 21 is caused to lean leftward of the vehicle 1, the upper cross member 51 turns about the support 51a. Specifically, the upper cross member 51 turns so that the left portion of the upper cross member 51 moves upwards in the up-down direction of the body frame 21 and the right portion of the upper cross member 51 moves downwards in the up-down direction of the body frame 21. The left side member 53 and the left portion of the upper cross member 51 are displaced upwards in the up-down direction of the body frame 21 and leftward in the left-right direction of the body frame 21 from their positions when the body frame 21 is in the upright state. The right side member 54 and the right portion of the upper cross member 51 are displaced downwards in the up-down direction of the body frame 21 and rightward in the left-right direction of the body frame 21 from their positions when the body frame 21 is in the upright state.

Because of this, as indicated by the reference numerals 51A, 53A, 54A in FIG. 11, when viewed from the front in the front-rear direction of the body frame 21, the left side member 53 and the left portion of the upper cross member 51 move upwards in the up-down direction of the body frame 21 from their positions when the body frame 21 is in the upright state, while the right side member 54 and the right portion of the upper cross member 51 move downwards in the up-down direction of the body frame 21 from their positions when the body frame 21 is in the upright state. Since the members are displaced in association with the turning of the upper cross member 51 about the support 51a, when viewed from the front of the body frame 21, the upward moving amount of the left side member 53 and the left portion of the upper cross member 51 from their positions when the body frame 21 is in the upright state is almost equal to the downward moving amount of the right side member 54 and the right portion of the upper cross member 51 from their positions when the body frame 21 is in the upright state.

In addition, when viewed from the front in the front-rear direction of the body frame 21, the left side member 53 and the left portion of the upper cross member 51 move rightward in the left-right direction of the body frame 21 from their positions when the body frame 21 is in the upright state, and the right side member 54 and the right portion of the upper cross member 51 move leftward in the left-right of the body frame 21 from their positions when the body frame 21 is in the upright state. Since the members are displaced in association with the turning of the upper cross member 51 about the support 51a, when viewed from the front of the body frame 21, the rightward moving amount of the left side member 53 and the left portion of the upper cross member 51 from their positions when the body frame 21 is in the upright state is almost equal to the leftward moving amount of the right side member 54 and the right portion of the upper cross member 51 from their positions when the body frame 21 is in the upright state.

When the body frame 21 is caused to lean rightward of the vehicle 1, the upper cross member 51 turns about the support 51a on the head pipe 211. Specifically, the upper cross member 51 turns so that the right portion of the upper cross member 51 moves upwards in the up-down direction of the body frame 21 and the left portion of the upper cross member 51 moves downwards in the up-down direction of the body frame 21. The right side member 54 and the right portion of the upper cross member 51 are displaced in the up-down direction of the body frame 21 and leftward in the left-right direction of the body frame 21 from their positions when the body frame 21 is in the upright state upwards. The left side member 53 and the left portion of the upper cross member 51 are displaced downwards in the up-down direction of the body frame 21 and rightward in the left-right direction of the body frame 21 from their positions when the body frame 21 is in the upright state.

Because of this, as indicated by the reference numerals 51B, 53B, 54B in FIG. 11, when viewed from the front in the front-rear direction of the body frame 21, the right side member 54 and the right portion of the upper cross member 51 move upwards in the up-down direction of the body frame 21 from their positions when the body frame 21 is in the upright state, while the left side member 53 and the left portion of the upper cross member 51 move downwards in the up-down direction of the body frame 21 from their positions when the body frame 21 is in the upright state. Since the members are displaced in association with the turning of the upper cross member 51 about the support 51a, when viewed from the front of the body frame 21, the downward moving amount of the left side member 53 and the left portion of the upper cross member 51 from their positions when the body frame 21 is in the upright state is almost equal to the upward moving amount of the right side member 54 and the right portion of the upper cross member 51 from their positions when the body frame 21 is in the upright state.

In addition, when viewed from the front in the front-rear direction of the body frame 21, the left side member 53 and the left portion of the upper cross member 51 move rightward from their positions when the body frame 21 is in the upright state, and the right side member 54 and the right portion of the upper cross member 51 move leftward from their positions when the body frame 21 is in the upright state. Since the members are displaced in association with the turning of the upper cross member 51 about the support 51a, when viewed from the front of the body frame 21, the rightward moving amount of the left side member 53 and the left portion of the upper cross member 51 from their positions when the body frame 21 is in the upright state is almost equal to the leftward moving amount of the right side member 54 and the right portion of the upper cross member 51 from their positions when the body frame 21 is in the upright state.

A chain line CMR in FIG. 11 indicates an outer edge of the movable range of the upper cross member 51. A chain line LMR in FIG. 11 indicates an outer edge of the movable range of the linkage 5. In the present preferred embodiment, the movable range CMR of the upper cross member 51 coincides with the movable range of the linkage 5 in an area located below the lower end CD of the upper cross member 51 in the up-down direction of the body frame 21.

In view of the operation of the linkage 5, the inventor of the present invention considered an area located above the lower end CD of the upper cross portion 51 in the up-down direction of the body frame 21, an area located on the left of a left edge LLE of the linkage 5 in the left-right direction of the body frame 21, and an area located on the right of a right edge LRE of the linkage 5 in the left-right direction of the body frame 21 when the vehicle 1 is in the condition that the body frame 21 is in the upright state and is viewed from the front in the front-rear direction of the body frame 21. In the event of the body cover 22 that is provided so as not to be movable relative to the body frame 21 is disposed in these areas, the inventor of the present invention considered a space above the lower end CD of the upper cross member 51 in the up-down direction of the body frame 21 by the body cover 22, a space on the left of the left edge LLE of the linkage 5 in the left-right direction of the body frame 21 by the body cover 22, and a space on the right of the right edge LRE of the linkage 5 in the left-right direction of the body frame 21 by the body cover 22 when the vehicle 1 is in the condition that the body frame 21 is in the upright state and is viewed from the front in the front-rear direction of the body frame 21.

As shown in FIGS. 9 and 11, the "left edge LLE of the linkage 5" refers to an outline of the upper cross member 51, the lower cross member 52 (not shown in FIG. 11) and the left side member 53 that are viewed from the front in the front-rear direction of the body frame 21. The "right edge LRE of the linkage 5" refers to an outline of the upper cross member 51, the lower cross member 52 (not shown in FIG. 11) and the right side member 54 that are viewed from the front in the front-rear direction of the body frame 21.

The space above the left side member 53 and the left portion of the upper cross member 51 in the up-down direction of the body frame 21 by the body cover 22 and the space above the right side member 54 and the right portion of the upper cross member 51 in the up-down direction of the body frame 21 by the body cover 22 will be described. In the case of the body frame 21 being caused to lean leftward of the vehicle 1, the left side member 53 and the left portion of the upper cross member 51 move upwards (as indicated by the reference numerals 51A, 53A) from their positions when the body frame 21 is in the upright state. Because of this, compared with the space when the body frame 21 is in the upright state, a space above the left side member 53 and the left portion of the upper cross member 51 in the up-down direction of the body frame 21 by the body cover 22 becomes narrow. On the other hand, the right side member 54 and the right portion of the upper cross member 51 move downwards (as indicated by the reference numerals 51A, 54A) from their positions when the body frame 21 is in the upright state. Because of this, a space above the right side member 54 and the right portion of the upper cross member 51 in the up-down direction of the body frame 21 by the body cover 22 becomes wide. As indicated by the reference numerals 51B, 53B, 54B, an opposite situation results when the body frame 21 is caused to lean rightward of the vehicle 1.

The space on the left of the left side member 53 and the left portion of the upper cross member 51 in the left-right direction of the body frame 21 by the body cover 22 and the space on the right of the right side member 54 and the right portion of the upper cross member 51 in the left-right direction of the body frame 21 by the body cover 22 will be described. In the case of the body frame 21 being caused to lean leftward of the vehicle 1, the left side member 53 and the left portion of the upper cross member 51 move rightward (as indicated by the reference numerals 51A, 53A) from their positions when the body frame 21 is in the upright state. Because of this, compared with the space when the body frame 21 is in the upright state, a space on the left of the left side member 53 and the left portion of the upper cross member 51 in the left-right direction of the body frame 21 by the body cover 22 becomes wide. The right side member 54 and the right portion of the upper cross member 51 move leftward (as indicated by the reference numerals 51A, 54A) from their positions when the body frame 21 is in the upright state. Because of this, compared with the space when the body frame 21 is in the upright state, a space on the right of the right side member 54 and the right portion of the upper cross member 51 in the left-right direction of the body frame 21 by the body cover 22 becomes wide. As indicated by the reference numerals 51B, 53B, 54B, this is also be true when the body frame 21 is caused to lean rightward of the vehicle 1.

Namely, when the vehicle 1 is in the condition that the body frame 21 is in the upright state and is viewed from the front in the front-rear direction of the body frame 21, a sectional area of the space above the lower end CD of the upper cross member 51 in the up-down direction of the body frame 21 by the body cover 22 changes a little or stays almost constant even though the shape of the linkage 5 changes greatly as the body frame 21 leans. This fact remains true irrespective of the leaning angle of the body frame in the left-right direction of the vehicle. In addition, when the vehicle 1 is in the condition that the body frame 21 is in the upright state and is viewed from the front in the front-rear direction of the body frame 21, sectional areas of the spaces on the left of the left edge LLE of the linkage 5 in the left-right direction of the body frame 21 and on the right of the right edge LRE of the linkage 5 in the left-right direction of the body frame 21 by the body cover 22 increase as the body frame 21 continues to lean. This fact also remains true irrespective of the leaning angle of the body frame 21 in the left-right direction of the vehicle 1.

The inventor of the present invention discovered that air is guided smoothly to the air cleaner 25 even though the linkage 5 described above is used and the body frame 21 is caused to lean in the left-right direction of the body frame 21 at a great leaning angle by providing the body cover 22 in such a way that the wind guiding spaces are above the lower end CD of the upper cross member 51 in the up-down direction of the body frame 21, on the left of the left edge LLE of the linkage 5 in the left-right direction of the body frame 21, and on the right of the right edge LRE of the linkage 5 in the left-right direction of the body frame 21 when the vehicle 1 is in the condition that the body frame 21 is in the upright state and is viewed from the front in the front-rear direction of the body frame 21, while the portion is provided which extends across the handlebar 651 that turns the two front wheels 3 in the front-rear direction of the body frame 21 below the handlebar 651 when the vehicle 1 is viewed from above in the up-down direction of the body frame 21, as shown in FIGS. 7 to 10. Namely, the inventor of the present invention discovered that it is possible to significantly reduce or prevent an enlargement in the size of the front portion of the vehicle 1 which would otherwise be necessary to guide air properly to the air cleaner even when at least a portion of the linkage 5 is disposed directly above the two front wheels 3 in the up-down direction of the body frame 21 when the vehicle 1 is viewed from the left-right direction of the body frame 21.

In view of what has been described above, as shown in FIGS. 7 to 11, the vehicle 1 according to the present preferred embodiment includes the body frame 21, the left front wheel 31, the right front wheel 32, the rear wheel 4, the handlebar 651, the linkage 5, the power drive 24, the air cleaner 25, and the body cover 22.

The body frame 21 leans leftward of the vehicle 1 when the vehicle 1 turns to the left, whereas when the vehicle 1 turns to the right, the body frame 21 leans to the right of the vehicle 1. The body frame 21 includes the head pipe 211.

The left front wheel 31 and the right front wheel 32 are arranged side by side in the left-right direction of the body frame 21. The handlebar 651 turns the left front wheel 31 and the right front wheel 32 (refer to FIG. 4).

As shown in FIG. 9, the linkage 5 includes the upper cross member 51, the left side member 53, and the right side member 54.

As shown in FIG. 9, the left side member 53 is disposed on the left of the head pipe 211 in the left-right direction of the body frame 21. As shown in FIG. 7, at least a portion of the left side member 53 is disposed directly above the left front wheel 31 in the up-down direction of the body frame 21 when the vehicle 1 is viewed from the left-right direction of the body frame 21.

As shown in FIG. 9, the right side member 54 is disposed on the left of the head pipe 211 in the left-right direction of the body frame 21. As shown in FIG. 10, at least a portion of the right side member 54 is disposed directly above the right front wheel 32 in the up-down direction of the body frame 21 when the vehicle 1 is viewed from the left-right direction of the body frame 21.

As shown in FIG. 9, the left portion of the upper cross member 51 is supported on the left side member 53 so as to turn about the left turning axis that extends in the front-rear direction of the body frame 21. The right portion of the upper cross member 51 is supported on the right side member 54 so as to turn about the right turning axis that extends in the front-rear direction of the body frame 21. The intermediate portion of the upper cross portion 51 is supported on the head pipe 211 so as to turn about the intermediate turning axis that extends in the front-rear direction of the body frame 21.

As shown in FIG. 7, the power drive 24 is disposed ahead of the front end of the rear wheel 4 in the front-rear direction of the body frame 21 so as not to be movable relative to the body frame 21 when the vehicle 1 is viewed from the left-right direction of the body frame 21. The power drive 24 includes an engine 241 and a transmission 242.

As shown in FIG. 7, the air cleaner 25 is disposed above the transmission 242 in the up-down direction of the body frame 21 so as not to be movable relative to the body frame 21. Air that is supplied to the engine 241 passes through the air cleaner 25.

The body cover 22 is disposed so as not to be movable relative to the body frame 21. As shown in FIG. 11, the body cover 22 includes the portion that extends across the handlebar 651 in the front-rear direction of the body frame 21 below the handlebar 651 in the up-down direction of the body frame 21 when the vehicle 1 is viewed from the above in the up-down direction of the body frame 21.

As shown in FIG. 11, the body cover 22 includes the left wind guiding cover 22L, the right wind guiding cover 22R, and the upper wind guiding cover 22U. The left wind guiding cover 22L, the right wind guiding cover 22R, and the upper wind guiding cover 22U define the spaces that guide air to the air cleaner 25. When the vehicle 1 is in the condition that the body frame 21 is in the upright state and is viewed from the front in the front-rear direction of the body frame 21, the left wind guiding cover 22L, the right wind guiding cover 22R, and the upper wind guiding cover 22U are disposed so that the spaces defined by those wind guiding covers are situated at least partially above the lower end CD of the upper cross member 51 in the up-down direction of the body frame 21, on the left of the left edge LLE of the linkage 5 in the left-right direction of the body frame 21 and on the right of the right edge LRE of the linkage 5 in the left-right direction of the body frame 21.

According to this configuration, even though the leaning angle of the body frame 21 in the left-right direction of the vehicle 1 is increased, air is easily guided to the air cleaner 25 irrespective of the operation of the linkage 5. This significantly reduces or prevents an enlargement in the size of the front portion of the vehicle 1 which would otherwise be necessary to ensure that air is properly guided to the air cleaner 25. Consequently, in a vehicle including the body frame 21 that is able to lean and the two front wheels 3 that are disposed so as to be arranged side by side in the left-right direction of the body frame 21, it is possible to significantly reduce or prevent an enlargement in the size of the front portion of the vehicle 1, while the leaning angle of the body frame 21 in the left-right direction of the vehicle 1 is able to be increased.

As shown in FIG. 11, when the vehicle 1 is in the condition that the body frame 21 is in the upright state and is viewed from the front in the front-rear direction of the body frame 21, the left wind guiding cover 22L, the right wind guiding cover 22R, and the upper wind guiding cover 22U are disposed so that the spaces defined by the left wind guiding cover 22L, the right wind guiding cover 22R, and the upper wind guiding cover 22U are situated at least partially above a lower end CMRD of the movable range CMR of the upper cross member 51 in the up-down direction of the body frame 21, on the left of a left end LMRL of the movable range LMR of the linkage 5 in the left-right direction of the body frame 21, and on the right of a right end LMRR of the movable range LMR of the linkage 5 in the left-right direction of the body frame 21.

According to this configuration, even though the leaning angle of the body frame 21 in the left-right direction of the vehicle 1 is increased, air is easily guided to the air cleaner 25 irrespective of the operating state of the linkage 5. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As shown in FIGS. 8, 9 and 11, the left wind guiding cover 22L and the right wind guiding cover 22R include portions that are situated directly on the left and right of the linkage 5 in the left-right direction of the body frame 21, respectively, when the vehicle 1 is in the condition that the body frame 21 is in the upright state and is viewed from the up-down direction of the body frame 21.

According to this configuration, it is easy to guide air that passes through the portions that are situated directly on the left and right of the linkage 5 in the left-right direction of the body frame 21 to the air cleaner 25. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As shown in FIGS. 7 and 10, the upper wind guiding cover 22U includes a portion located directly above the upper cross member 51 in the up-down direction of the body frame 21 when the vehicle 1 is in the condition that the body frame 21 is in the upright state and is viewed from the left-right direction of the body frame 21.

According to this configuration, it is easy to guide air that passes through the portion located directly above the upper cross member 51 in the up-down direction of the body frame 21 to the air cleaner 25. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As is shown in FIGS. 7 to 11, a portion of the left wind guiding cover 22L, a portion of the right wind guiding cover 22R, and the upper wind guiding cover 22U include portions of the front cover 221 located ahead of the linkage 5 in the front-rear direction of the body frame 21.

According to this configuration, it is easy to guide an air flow received by the front portion of the vehicle 1 in motion to the air cleaner 25. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As shown in FIG. 9, the front cover 221 includes the intermediate opening 224, the left opening 225, and the right opening 226 that are disposed ahead of the linkage 5 in the front-rear direction of the body frame 21.

According to this configuration, it is easy to guide the air flow received by the front portion of the vehicle 1 in motion to the spaces defined in the interior of the body cover 22 that define the wind guiding cover. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As shown in FIGS. 8, 9 and 11, the body cover 22 includes the left wind guiding cover 22L and the right wind guiding cover 22R. The left wind guiding cover 22L is disposed on the left of the head pipe 211 in the left-right direction of the body frame 21. The right wind guiding cover 22R is disposed on the right of the head pipe 211 in the left-right direction of the body frame 21. The space defined between the left wind guiding cover 22L and the right wind guiding cover 22R at the portion behind the handlebar 651 in the front-rear direction of the body frame 21 and ahead of the rear end of the air cleaner 25 in the front-rear direction of the body frame 21 increases towards the front in the front-rear direction of the body frame 21 when the vehicle 1 is in the condition that the body frame 21 is in the upright state and is viewed from the above in the up-down direction of the body frame 21.

According to this configuration, air is guided easily to the air cleaner 25 by the portions of the body cover 22 that define wind guiding cover. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As shown in FIGS. 7 to 11, the body cover 22 includes the upper wind guiding cover 22U that defines a portion of the space located above the lower end CD of the upper cross member 51 in the up-down direction of the body frame 21. When the vehicle 1 is in the condition that the body frame 21 is in the upright state and is viewed from the left-right direction of the body frame 21, the upper wind guiding cover 22U extends upwards in the up-down direction of the body frame 21 with an increasing distance from the air cleaner 25 towards the front in the front-rear direction of the body frame 21 at the portion located behind the handlebar 651 in the front-rear direction of the body frame 21 and ahead of the rear end of the air cleaner 25 in the front-rear direction of the body frame 21.

According to this configuration, air is guided easily to the air cleaner 25 by the portions of the body cover 22 that define the wind guiding cover. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As shown in FIGS. 7 and 8, the air cleaner 25 is disposed ahead of the seat 23 on which the rider sits in the front-rear direction of the body frame 21.

According to this configuration, a distance over which air guided by the portion of the body cover 22 that defines the wind guiding cover reaches the air cleaner 25 is shortened. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As shown in FIGS. 7 and 8, the air cleaner 25 is disposed ahead of the transmission 242 in the front-rear direction of the body frame 21.

According to this configuration, a distance over which air guided by the portion of the body cover 22 that defines the wind guiding cover reaches the air cleaner 25 is shortened. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As shown in FIG. 7, the front end of the air cleaner 25 is disposed ahead of the engine 241 in the front-rear direction of the body frame 21.

According to this configuration, a distance over which air guided by the portion of the body cover 22 that defines the wind guiding cover reaches the air cleaner 25 is shortened. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

As shown in FIGS. 7 and 8, the air cleaner 25 includes the air intake ports 251 that are opened to the front in the front-rear direction of the body frame 21.

According to this configuration, air is guided easily to the air cleaner 25 by the portions of the body cover 22 that define the wind guiding cover. This significantly reduces or prevents an enlargement in the size of the front portion of the vehicle 1 which would otherwise be necessary to ensure that air is properly guided to the air cleaner 25. Consequently, it is possible to significantly reduce or prevent an enlargement in the size of the front portion of the vehicle 1 while allowing the leaning angle of the body frame 21 in the left-right direction of the vehicle 1 to be increased.

The preferred embodiments described heretofore are intended to facilitate the understanding of the present invention and are not intended to limit the present invention. It is apparent that the present invention may be modified or improved without departing from the scope thereof and that their equivalents are also included in the present invention.

In the above preferred embodiments, the spaces that are defined by the body cover 22 and are situated above the lower end CD of the upper cross member 51 in the up-down direction of the body frame 21; on the left of the left edge LLE of the linkage 5 in the left-right direction of the body frame 21; and on the right of the right edge LRE of the linkage 5 in the left-right direction of the body frame 21 when the vehicle 1 is in the condition that the body frame 21 is in the upright state and is viewed from the front in the front-rear direction of the body frame 21 are preferably used to guide air to the air cleaner 25. However, as long as the air cleaner 25 exhibits the desired function, a configuration may be used in which at least one of the spaces that are situated above the lower end CD of the upper cross member 51 in the up-down direction of the body frame 21; on the left of the left edge LLE of the linkage 5 in the left-right direction of the body frame 21; and on the right of the right edge LRE of the linkage 5 in the left-right direction of the body frame 21 when the vehicle 1 is in the condition that the body frame 21 is in the upright state and is viewed from the front in the front-rear direction of the body frame 21 is used to guide air to the air cleaner 25.

For example, a configuration may be used in which the body cover 22 is disposed so to define spaces that are situated above the lower end CD of the upper cross member 51 in the up-down direction of the body frame 21; on the right of the left edge LLE of the linkage 5 in the left-right direction of the body frame 21; and on the left of the right edge LRE of the linkage 5 in the left-right direction of the body frame 21 when the vehicle 1 is in the condition that the body frame 21 is in the upright state and is viewed from the front in the front-rear direction of the body frame 21. Additionally, a configuration may be used in which the body cover 22 is disposed so to define spaces that are situated below the lower end CD of the upper cross member 51 in the up-down direction of the body frame 21; on the left of the left edge LLE of the linkage 5 in the left-right direction of the body frame 21; and on the right of the right edge LRE of the linkage 5 in the left-right direction of the body frame 21 when the vehicle 1 is in the condition that the body frame 21 is in the upright state and is viewed from the front in the front-rear direction of the body frame 21.

In the above preferred embodiments, the spaces that are defined by the body cover 22 and are situated above the lower end CMRD of the movable range CMR of the upper cross member 51 in the up-down direction of the body frame 21; on the left of the left end LMRL of the movable range LMR of the linkage 5 in the left-right direction of the body frame 21; and on the right of the right end LMRR of the movable range LMR of the linkage 5 in the left-right direction of the body frame 21 when the vehicle 1 is in the condition that the body frame 21 is in the upright state and is viewed from the front in the front-rear direction of the body frame 21 are used to guide air to the air cleaner 25. However, as long as the air cleaner 25 exhibits the desired function, a configuration may be used in which at least one of the spaces that are situated above the lower end CMRD of the movable range CMR of the upper cross member 51 in the up-down direction of the body frame 21; on the left of the left end LMRL of the movable range LMR of the linkage 5 in the left-right direction of the body frame 21; and on the right of the right end LMRR of the movable range LMR of the linkage 5 in the left-right direction of the body frame 21 when the vehicle 1 is in the condition that the body frame 21 is in the upright state and is viewed from the front in the front-rear direction of the body frame 21 and that are defined by the body cover 22 is used to guide air to the air cleaner 25.

For example, a configuration may be used in which the body cover 22 is disposed so as to define spaces that are situated above the lower end CMRD of the movable range CMR of the upper cross member 51 in the up-down direction of the body frame 21; on the right of the left end LMRL of the movable range LMR of the linkage 5 in the left-right direction of the body frame 21; and on the left of the right end LMRR of the movable range LMR of the linkage 5 in the left-right direction of the body frame 21 when the vehicle 1 is in the condition that the body frame 21 is in the upright state and is viewed from the front in the front-rear direction of the body frame 21. Additionally, a configuration may be used in which the body cover 22 is disposed so as to define spaces that are situated below the lower end CMRD of the movable range CMR of the upper cross member 51 in the up-down direction of the body frame 21; on the left of the left end LMRL of the movable range LMR of the linkage 5 in the left-right direction of the body frame 21; and on the right of the right end LMRR of the movable range LMR of the linkage 5 in the left-right direction of the body frame 21 when the vehicle 1 is in the condition that the body frame 21 is in the upright state and is viewed from the front in the front-rear direction of the body frame 21.

In the above preferred embodiments, the portions of the body cover 22 which are situated directly on the left and directly on the right of the linkage 5 in the left-right direction of the body frame 21, respectively, when the vehicle 1 is in the condition that the body frame 21 is in the upright state and is viewed from the up-down direction of the body frame 21 are preferably used to guide air to the air cleaner 25. However, as long as the air cleaner 25 exhibits the desired function, a configuration may be used in which either of the portions of the body cover 22 that are situated directly on the left and directly on the right of the linkage 5 in the left-right direction of the body frame 21, respectively, when the vehicle 1 is in the condition that the body frame 21 is in the upright state and is viewed from the up-down direction of the body frame 21 is used to guide air to the air cleaner 25.

In the above preferred embodiments, the left wind guiding cover 22L, the right wind guiding cover 22R, and the upper wind guiding cover 22U cover the portions of the body frame 21 that are situated directly on the left and directly on the right of the linkage 5 in the left-right direction of the body frame 21, the portion of the body cover 22 located directly above the linkage 5 in the up-down direction of the body frame 21, and the portion of the body cover 22 located directly ahead of the linkage 5 in the front-rear direction of the body frame 21. However, the left wind guiding cover 22L, the right wind guiding cover 22R, and the upper wind guiding cover 22U do not have to cover the portion of the body frame 21 located directly ahead of the linkage 5 in the front-rear direction of the body frame 21, as long as at least one of the spaces that are situated above the lower end CD of the upper cross member 51 in the up-down direction of the body frame 21; on the left of the left edge LLE of the linkage 5 in the left-right direction of the body frame 21; and on the right of the right edge LRE of the linkage 5 in the left-right direction of the body frame 21 when the vehicle 1 is in the condition that the body frame 21 is in the upright state and is viewed from the front in the front-rear direction of the body frame 21 is used to guide air to the air cleaner 25.

For example, the left wind guiding cover 22L, the right wind guiding cover 22R, and the upper wind guiding cover 22U may be arranged so that a front end of at least one of the left wind guiding cover 22L, the right wind guiding cover 22R, and the upper wind guiding cover 22U is situated behind the linkage 5 in the front-rear direction of the body frame 21 when viewed from the left-right direction of the body frame 21. A dashed chain line CVF shown in FIG. 10 denotes a front end of the body cover 22 arranged in the manner described above. Additionally, the left wind guiding cover 22L, the right wind guiding cover 22R, and the upper wind guiding cover 22U may be arranged so that a front end of at least one of the left wind guiding cover 22L, the right wind guiding cover 22R, and the upper wind guiding cover 22U is partially situated behind the linkage 5 in the front-rear direction of the body frame 21.

In the above preferred embodiments, the space defined between the left wind guiding cover 22L and the right wind guiding cover 22R at the portion behind the handlebar 651 in the front-rear direction of the body frame 21 and ahead of the rear end of the air cleaner 25 in the front-rear direction of the body frame 21 increases towards the front in the front-rear direction of the body frame 21 when the vehicle 1 is in the condition that the body frame 21 is in the upright state and is viewed from the above in the up-down direction of the body frame 21. The space between the left wind guiding cover 22L and the right wind guiding cover 22R decreases towards a front end of the front cover 221 at a portion ahead of the handlebar 651 in the front-rear direction of the body frame 21 when the vehicle 1 is in the condition that the body frame 21 is in the upright state and is viewed from the up-down direction of the body frame 21. However, as long as a desired amount of air is guided to the air cleaner 25, the shapes of the left wind guiding cover 22L and the right wind guiding cover 22R may be determined as required.

For example, a configuration may be used in which the space defined between the left wind guiding cover 22L and the right wind guiding cover 22R at the portion behind the handlebar 651 in the front-rear direction of the body frame 21 and ahead of the rear end of the air cleaner 25 in the front-rear direction of the body frame 21 includes a portion where the space decreases towards the front in the front-rear direction of the body frame 21 and a portion where the space remains constant when the vehicle 1 is in the condition that the body frame 21 is in the upright state and is viewed from the above in the up-down direction of the body frame 21. Additionally, a configuration may be used in which the space between the left wind guiding cover 22L and the right wind guiding cover 22R at the portion situated ahead of the handlebar 651 in the front-rear direction of the body frame 21 includes a portion where the space increases towards the front end of the front cover 221 and a portion where the space remains constant when the vehicle 1 is in the condition that the body frame 21 is in the upright state and is viewed from the above in the up-down direction of the body frame 21.

In the above preferred embodiments, the upper wind guiding cover 22U preferably extends upwards in the up-down direction of the body frame 21 with an increasing distance from the air cleaner 25 towards the front in the front-rear direction of the body frame 21 at the portion located behind the handlebar 651 in the front-rear direction of the body frame 21 and ahead of the rear end of the air cleaner 25 in the front-rear direction of the body frame 21, when the vehicle 1 is in the condition that the body frame 21 is in the upright state and is viewed from the left-right direction of the body frame 21. When the vehicle 1 is in the condition that the body frame 21 is in the upright state and is viewed from the left-right direction of the body frame 21, the upper wind guiding cover 22U extends almost parallel to the front-rear direction of the body frame 21 at a portion located directly below the handlebar 651 in the up-down direction of the body frame 21. When the vehicle 1 is in the condition that the body frame 21 is in the upright state is viewed from the left-right direction of the body frame 21, the upper wind guiding cover 22U extends downwards towards a front end of the front cover 221 in the up-down direction of the body frame 21 at a portion located ahead of the handlebar 651 in the front-rear direction of the body frame 21. However, as long as a desired amount of air is guided to the air cleaner 25, the shapes of the left wind guiding cover 22L and the right wind guiding cover 22R may be determined as required.

For example, a configuration may be used in which the upper wind guiding cover 22U includes a portion that extends almost parallel to the front-rear direction of the body frame 21 and a portion that extends downwards in the up-down direction of the body frame 21 with increasing distance from the air cleaner 25 towards the front in the front-rear direction of the body frame 21 at the portion located behind the handlebar 651 in the front-rear direction of the body frame 21 and ahead of the rear end of the air cleaner 25 in the front-rear direction of the body frame 21, when the vehicle 1 is in the condition that the body frame 21 is in the upright state and is viewed from the left-right direction of the body frame 21. A configuration may be used in which the upper wind guiding cover 22U includes a portion that extends upwards or downwards in the up-down direction of the body frame 21 at a portion located directly below the handlebar 651 in the up-down direction of the body frame 21 when the vehicle 1 is in the condition that the body frame 21 is in the upright state and is viewed from the left-right direction of the body frame 21. A configuration may be used in which the upper wind guiding cover 22U includes a portion that extends almost parallel to the front-rear direction of the body frame 21 towards the front end of the front cover 221 and a portion that extends upwards in the up-down direction of the body frame 21 at a portion located ahead of the handlebar 651 in the front-rear direction of the body frame 21, when the vehicle 1 is in the condition that the body frame 21 is in the upright state and is viewed from the left-right direction of the body frame 21.

In the above preferred embodiments, the intermediate opening 224, the left opening 225, and the right opening 226 are preferably provided in the front cover 221. However, the number, shapes, and locations of the openings may be determined as required as long as air is allowed to flow into the spaces defined in the interior of the body cover 22 so as to guide air to the air cleaner 25. However, a configuration is preferable in which the shapes and locations of the openings are symmetrical relative to the left-right direction with respect to the intermediate steering axis Z when the vehicle 1 is in the condition that the body frame 21 is in the upright state and is viewed from the front in the front-rear direction of the body frame 21.

In the above preferred embodiments, the air cleaner 25 includes the plurality of intake ports 251. However, as long as the air cleaner 25 exhibits the desired function, the number of intake ports 251 may be one.

In the above preferred embodiments, the intake ports 251 are opened towards the front in the front-rear direction of the body frame 21. However, as long as the air cleaner 25 exhibits the desired function, the orientation of the intake ports 251 may be determined as required. For example, the intake port 251 may be provided in an upper surface of the air cleaner 25 and may be opened towards the rear in the front-rear direction of the body frame 21 or opened towards the left or right in the left-right direction of the body frame 21. The intake port 251 may be provided in a right side surface or a left side surface of the air cleaner 25 and may be opened upwards or downwards in the up-down direction of the body frame 21 or opened towards the left or right in the left-right direction of the body frame 21. The intake port 251 may be provided in a lower surface of the air cleaner 25 and may be opened towards the front or rear in the front-rear direction of the body frame 21 or opened towards the left or right in the left-right direction of the body frame 21 or oriented downwards in the up-down direction of the body frame 21. In the event of a plurality of intake ports 251 are provided, the plurality of intake ports 251 may be opened in the same direction or in different directions.

In the above preferred embodiments, the left shock absorber 61 and the right shock absorber 62 each preferably include a pair of telescopic mechanisms. However, each of the left shock absorber 61 and the right shock absorber 62 may include a single telescopic mechanism according to the specification of the vehicle 1. Additionally, a bottom linkage may be used for the left shock absorber 61 and the right shock absorber 62 according to the specification of the vehicle 1.

In the above preferred embodiments, the vehicle 1 includes the single rear wheel 4. However, the vehicle 1 may include a plurality of rear wheels.

In the above preferred embodiments, the center of the rear wheel 4 in relation to the left-right direction of the body frame 21 coincides with the center of the distance defined between the left front wheel 31 and the right front wheel 32 in relation to the left-right direction of the body frame 21. Although the configuration described above is preferable, the center of the rear wheel 4 in relation to the left-right direction of the body frame 21 may not coincide with the center of the distance defined between the left front wheel 31 and the right front wheel 32 in relation to the left-right direction of the body frame 21.

In the above preferred embodiments, the linkage 5 includes the upper cross member 51 and the lower cross member 52. However, a configuration may be used in which the linkage 5 includes either the upper cross member 51 or the lower cross member 52 as an example of a cross member. As this occurs, the lower end CD of the cross member is defined for at least one cross member that the linkage 5 includes. In addition, a configuration may be used in which the linkage 5 includes a cross member other than the upper cross member 51 and the lower cross member 52. The "upper cross member" and the "lower cross member" are merely so called based on their relative positional relationship in the up-down direction. The upper cross member does not mean an uppermost cross member in the linkage 5. The upper cross member refers to a cross member that lies above another cross member that lies therebelow. The lower cross member does not mean a lowermost cross member in the linkage 5. The lower cross member refers to a cross member that lies below another cross member that lies thereabove.

In a preferred embodiment, the upper cross member 51 is a single plate-shaped member, while the lower cross member 52 includes the front plate-shaped member 521 and the rear plate-shaped member 522. However, a configuration may be used in which the upper cross member 51 includes a front plate-shaped member and a rear plate-shaped member. Additionally, a configuration may be used in which the lower cross member 52 is defined by a single plate-shaped member. A configuration may be used in which at least one of the upper cross member 51 and the lower cross member 52 includes a left plate-shaped member that is supported on the head pipe 211 and the left side member 53 and a right plate-shaped member that is supported on the head pipe 211 and the right side member 54.

In the above preferred embodiments, the handlebar 651 is preferably defined by a single member that extends in the left-right direction of the body frame. However, a configuration may be used in which the handlebar 651 includes a left handlebar portion that is operated by the left hand of the rider and a right handlebar portion that is operated by the right hand of the rider and are provided as separate members, as long as the steering force to turn the left front wheel 31 and the right front wheel 32 is input through the handlebar 651.

In the above preferred embodiments, the linkage 5 is preferably supported on the head pipe 211 which is an example of the link support. However, a configuration may be used in which the linkage 5 is supported on a portion of the body frame 21 other than the head pipe 211 that supports the steering shaft 652.

In the above preferred embodiments, the steering mechanism 6 includes the handlebar 651, the steering shaft 652, the intermediate transmission plate 653, the left transmission plate 654, the right transmission plate 655, the intermediate joint 656, the left joint 657, the right joint 658, and the tie rod 659. However, as long as the steering force inputted from the handlebar 651 is transmitted to the left front wheel 31 and the right front wheel 32 by way of the tie rod 69, the intermediate transmission plate 653, the left transmission plate 654, the right transmission plate 655, the intermediate joint 656, the left joint 657, and the right joint 658 may be replaced by appropriate mechanisms such as universal joints.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of ±40 degrees are comprised therein. When used in this description to depict directions and members, the expression "along a certain direction" means that a case where something inclines at an angle falling within the range of ±40 degrees relative to the certain direction is comprised therein. When used in this description, the expression "something extends in a certain direction" means that a case where something extends while being inclined at an angle falling within the range of ±40 degrees relative to the certain direction is comprised therein.

When used in this description, the expression "so as not to be movable relative to the body frame 21" means that a certain element or member is caused to lean in the left-right direction of the vehicle 1 together with the body frame 21 when the body frame 21 is caused to lean in the left-right direction of the vehicle 1. When used in this description, the expression "so as not to be movable relative to the body frame 21" may include not only a case where a certain element or member is directly fixed to the body frame but also a case where the certain element of member is fixed to a vehicle component (a fuel tank, a bracket, the power drive 24, etc.) which is fixed on the body frame 21. Here the term "fixed" may include a case that a certain element or member is fixed by way of a damping member or the like.

The present invention is implemented with many different preferred embodiments. This description should be understood to provide preferred embodiments of the present invention. The preferred embodiments which are at least described or illustrated in this description are so described or illustrated based on the understanding that the preferred embodiments are not intended to limit the present invention.

The present invention includes every preferred embodiment which includes an equivalent element, a modification, a deletion, a combination (for example, a combination of characteristics of various preferred embodiments), an improvement and an alteration which is recognized by those skilled in the art to which the present invention pertains based on the preferred embodiments disclosed in this description. The claims should be construed broadly based on terms used in the claims and hence should not be limited by the preferred embodiments described in this specification or the prosecution of this patent application. Those preferred embodiments should be construed as non-exclusive. For example, in this description, the terms "preferable" and "may" should be construed as being non-exclusive, and those terms mean, respectively, that it is "preferable but not limited thereto" and that it "may be acceptable but not limited thereto."

This application claims priority to Japanese Patent Application No. 2014-199003 filed on Sep. 29, 2014, the entire contents of which are hereby incorporated by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a body frame that includes a link support and that leans leftward of the vehicle when the vehicle turns to the left and leans rightward of the vehicle when the vehicle turns to the right;
   a left front wheel and a right front wheel arranged side by side in a left-right direction of the body frame;
   a rear wheel;
   a handlebar that turns the left front wheel and the right front wheel;
   a linkage including:
      a left side member disposed on a left of the link support in the left-right direction of the body frame, and at least partially disposed directly above the left front wheel in an up-down direction of the body frame when the vehicle is viewed from the left-right direction of the body frame;
      a right side member disposed on a right of the link support in the left-right direction of the body frame, and at least partially disposed directly above the right front wheel in the up-down direction of the body frame when the vehicle is viewed from the left-right direction of the body frame; and
      a cross member including:
         a left portion supported by the left side member so as to be turnable about a left turning axis extending in a front-rear direction of the body frame;
         a right portion supported by the right side member so as to be turnable about a right turning axis extending in the front-rear direction of the body frame; and
         an intermediate portion supported by the link support so as to be turnable about an intermediate turning axis extending in the front-rear direction of the body frame;
   a power drive disposed ahead of a front end of the rear wheel in the front-rear direction of the body frame when the vehicle is viewed from the left-right direction of the body frame and disposed so as not to be movable relative to the body frame, the power drive including an engine and a transmission;
   an air cleaner disposed above the transmission in the up-down direction of the body frame so as not to be movable relative to the body frame, the air cleaner allowing air to be supplied to the engine to pass therethrough; and
   a wind guiding cover disposed so as not to be movable relative to the body frame and defining a space to guide air to the air cleaner, the wind guiding cover including a portion extending in the front-rear direction of the body frame across an area located below the handlebar in the up-down direction of the body frame when the vehicle is viewed from above in the up-down direction of the body frame; wherein the linkage changes relative positions of the left front wheel and the right front wheel in the up-down direction of the body frame in accordance with turning of the cross member to cause the body frame to lean leftward or rightward of the vehicle; and the wind guiding cover is disposed such that, when the vehicle is in a condition that the body frame is in an upright state and is viewed from the front in the front-rear direction, the space is at least partially situated at least one of:

above a lower end of the cross member in the up-down direction of the body frame;

on a left of a left edge of the linkage in the left-right direction of the body frame; and on a right of a right edge of the linkage in the left-right direction of the body frame.

2. The vehicle as set forth in claim 1, wherein the wind guiding cover is disposed such that, when the vehicle is in the condition that the body frame is in the upright state and is viewed from the front in the front-rear direction, the space is at least partially situated at least one of:

above a lower end of a movable range of the cross member in the up-down direction of the body frame;

on a left of a left end of a movable range of the linkage in the left-right direction of the body frame; and on a right of a right end of the movable range of the linkage in the left-right direction of the body frame.

3. The vehicle as set forth in claim 1, wherein, when the vehicle is in the condition that the body frame is in the upright state and is viewed from the up-down direction, the wind guiding cover includes a portion disposed at least one of:

directly on a left of the body frame in the left-right direction of the body frame; and directly on a right of the body frame in the left-right direction of the body frame.

4. The vehicle as set forth in claim 1, wherein, when the vehicle is in the condition that the body frame is in the upright state and is viewed from the left-right direction, the wind guiding cover includes a portion disposed above the cross member in the up-down direction of the body frame.

5. The vehicle as set forth in claim 1, wherein the wind guiding cover includes a portion disposed ahead of the linkage in the front-rear direction of the body frame.

6. The vehicle as set forth in claim 5, wherein the wind guiding cover includes an opening disposed ahead of the linkage in the front-rear direction of the body frame.

7. The vehicle as set forth in claim 1, wherein the wind guiding cover includes:

a left wind guiding cover disposed on a left of the link support in the left-right direction of the body frame; and a right wind guiding cover disposed on a right of the link support in the left-right direction of the body frame; wherein a distance between the left wind guiding cover and the right guiding cover increases toward a front in the front-rear direction of the body frame at an area behind the handlebar in the front-rear direction of the body frame and ahead of a rear end of the air cleaner in the front-rear direction of the body frame, when the vehicle is in the condition that the body frame is in the upright state and is viewed from the up-down direction.

8. The vehicle as set forth in claim 1, wherein the wind guiding cover includes an upper wind guiding cover partially defining the space disposed above the lower end of the cross member in the up-down direction of the body frame; and the upper wind guiding cover extends upward in the up-down direction of the body frame with an increasing distance from the air cleaner toward the front in the front-rear direction of the body frame at an area behind the handlebar in the front-rear direction of the body frame and ahead of a rear end of the air cleaner in the front-rear direction of the body frame, when the vehicle is in the condition that the body frame is in the upright state is viewed from the left-right direction.

9. The vehicle as set forth in claim 1, wherein the air cleaner is disposed ahead of a seat on which a rider sits in the front-rear direction of the body frame.

10. The vehicle as set forth in claim 1, wherein the air cleaner is disposed ahead of the transmission in the front-rear direction of the body frame.

11. The vehicle as set forth in claim 1, wherein a front end of the air cleaner is disposed ahead of the engine in the front-rear direction of the body frame.

12. The vehicle as set forth in claim 1, wherein the air cleaner includes an intake port opened toward a front of the vehicle in the front-rear direction of the body frame.

* * * * *